United States Patent
Xie

(10) Patent No.: US 11,120,307 B2
(45) Date of Patent: Sep. 14, 2021

(54) MULTI-TASK LEARNING FOR DENSE OBJECT DETECTION

(71) Applicant: MEMORIAL SLOAN KETTERING CANCER CENTER, New York, NY (US)

(72) Inventor: Chensu Xie, New York, NY (US)

(73) Assignee: MEMORIAL SLOAN KETTERING CANCER CENTER, New York, NY (US)

(*) Notice: Subject to any disclaimer, the term of this patent is extended or adjusted under 35 U.S.C. 154(b) by 0 days.

(21) Appl. No.: 17/001,524

(22) Filed: Aug. 24, 2020

(65) Prior Publication Data

US 2021/0056361 A1 Feb. 25, 2021

Related U.S. Application Data

(60) Provisional application No. 62/890,807, filed on Aug. 23, 2019.

(51) Int. Cl.
*G06K 9/62* (2006.01)
*G06K 9/00* (2006.01)
*G06T 7/00* (2017.01)

(52) U.S. Cl.
CPC ......... *G06K 9/6265* (2013.01); *G06K 9/0014* (2013.01); *G06K 9/6232* (2013.01);
(Continued)

(58) Field of Classification Search
None
See application file for complete search history.

(56) References Cited

U.S. PATENT DOCUMENTS

2017/0147905 A1* 5/2017 Huang ................ G06K 9/6232
2018/0060722 A1* 3/2018 Hwang ................ G06N 3/0454
(Continued)

FOREIGN PATENT DOCUMENTS

CN 109493330 A * 3/2019

OTHER PUBLICATIONS

Xie, Chensu, et al. "VOCA: cell nuclei detection in histopathology images by vector oriented confidence accumulation." International Conference on Medical Imaging with Deep Learning. PMLR, 2019. (Year: 2019).*
Gondal, Waleed M., et al. "Weakly-supervised localization of diabetic retinopathy lesions in retinal fundus images." 2017 IEEE international conference on image processing (ICIP). IEEE, 2017. (Year: 2017).*
(Continued)

*Primary Examiner* — Samah A Beg
(74) *Attorney, Agent, or Firm* — Foley & Lardner LLP

(57) ABSTRACT

Presented herein are systems and methods for feature detection in images. A computing system may identify a biomedical image having features. The computing system may apply the biomedical image to a feature detection model. The feature detection model may include an encoder-decoder block to generate a feature map corresponding to the biomedical image, a confidence map generator having a second set of parameters to generate a confidence map using the feature map, and a localization map generator to generate a localization map using the feature map. The computing system may generate a resultant map based on the confidence map and the localization map. The resultant map identifying one or more points corresponding to the one or more features. The computing system may provide the one or more points identified in the resultant map for the biomedical image.

20 Claims, 20 Drawing Sheets

(52) U.S. Cl.
CPC .. *G06T 7/0012* (2013.01); *G06T 2207/10056* (2013.01); *G06T 2207/30061* (2013.01); *G06T 2207/30068* (2013.01); *G06T 2207/30096* (2013.01)

(56) References Cited

U.S. PATENT DOCUMENTS

| | | | |
|---|---|---|---|
| 2018/0068198 A1* | 3/2018 | Sawides | G06K 9/6274 |
| 2019/0026538 A1* | 1/2019 | Wang | G06K 9/4642 |
| 2019/0145765 A1* | 5/2019 | Luo | G06K 9/00791 |
| | | | 702/153 |
| 2020/0025935 A1* | 1/2020 | Liang | G06K 9/629 |
| 2020/0057935 A1* | 2/2020 | Wang | G06N 3/084 |
| 2020/0097739 A1* | 3/2020 | Hashimoto | B60W 30/0956 |

OTHER PUBLICATIONS

Sermanet, Pierre, et al. "Overfeat: Integrated recognition, localization and detection using convolutional networks." arXiv preprint arXiv:1312.6229 (2013). (Year: 2013).*

Chensu Xie et al: "VOCA: Cell Nuclei Detection in Histopathology Images by Vector Oriented Confidence Accumulation", Proceedings of Machine Learning Research—2$^{nd}$ International Conference on Medical Imaging With Deep Learn I Ng (MIDL), vol. 102, Jul. 8, 2019 (Jul. 8, 2019), pp. 527-539, XP055736119,the whole document.

International Search Report and Written Opinion dated Oct. 28, 2020 (17 pages).

* cited by examiner

MULTI-TASK LEARNING FOR DENSE OBJECT DETECTION

CROSS REFERENCE TO RELATED APPLICATIONS

The present application claims priority to U.S. Provisional Application No. 62/890,807, titled "Multi-Task Learning for Dense Object Detection," filed Aug. 23, 2019, which is incorporated herein by reference in its entirety.

STATEMENT OF GOVERNMENT SUPPORT

The invention was made with government support under P30 CA008748 awarded by the National Institute of Health/National Cancer Institute (NIH/NCI). The government has certain rights in the invention.

TECHNICAL FIELD

The present applications relates generally to object detection, including but not limited to automatic cell detection on histopathological images by using a deep multi-task learning method.

BACKGROUND

An image may have one or more features. A model or an algorithm executing on a computing device may be used to automatically recognize the features within the image.

SUMMARY

Cell nuclei detection is the basis for many tasks in computational pathology ranging from cancer diagnosis to survival analysis. One of the most critical bottlenecks in practice is dense nuclei detection at scale on gigapixel images. A study with multiple digitized whole slides can easily contain millions of cells. Hence in practice pathologists only roughly estimate cell counts as an alternative metric. Automatic detection of cell nuclei which gives the accurate location and characteristics of cells can overcome this bottleneck and produce interpretable features for downstream applications.

Most deep learning approaches to cell nuclei detection are based on convolutional neural networks that produce accumulator maps of pixel-wise prediction. The final detection of the cells is achieved by identifying the peaks in the accumulator map using mean shift or non-maximum suppression. Recent approaches to cell detection switched from the traditional sliding-window system to fast auto-encoded regression based on the distance to the nearest cell nucleus. Another class of studies utilized two-stage detectors to explore the fine-grained instance classification on top of non-discriminating recognition of all cells from background. These methods do not learn the position of cell nuclei and impose hardness for peak detection in areas with densely packed cells.

The approach presented herein, referred to as deep multi-task cell detector, concurrently learns the classification, localization and weight of contribution tasks for all pixels that combine into an accumulator map which describes accurate and precise nuclei locations. The deep multi-task cell detection can produce crisp accumulator map for robust post-processing and much faster execution speed than the existing methods. The joined learning of multiple tasks also result in higher detection precision and recall. The model takes input of size 127×127 and feeds it forward to 4 encoding and 4 decoding blocks followed by 3 1×1 conv layers to produce the task maps. This framework can utilize different encoding and decoding blocks thus the depth can vary from 8 to >100. All pooling and up-sampling was achieved by 3×3 conv/deconv layers at stride 2 to preserve accurate location information. On top the last 1×1 conv layers, a sigmoid was used as the activation function for classification map, since it is more stable to the binary cross entropy loss $L_{cls}$. Identity activation was used for localization map as it requires learning of both negative and positive regression targets. For the weight of contribution map ReLU was selected as the activation to learn the positive cell counts.

At least one aspect of the present disclosure is directed to systems and methods of training feature detection models. A computing system may identify a training dataset. The training dataset may have a sample biomedical image having one or more features. The training dataset may have a first confidence map derived from the sample biomedical image. The first confidence map may identify a confidence score for each pixel as correlated with the one or more features. The training dataset may have a first localization map derived from the sample biomedical image. The first localization map may identify at least one of a magnitude and a direction to apply to the first confidence map. The computing system may apply the sample biomedical image of the training dataset to a feature detection model. The feature detection model may include: an encoder-decoder block having a first set of parameters to generate a feature map corresponding to the sample biomedical image, confidence map generator having a second set of parameters to generate a second confidence map using the feature map; and a localization map generator having a third set of parameters to generate a second localization map using the feature map. The computing system may determine an error metric based on the first confidence map, the second confidence map, the first localization map, and the second localization map. The computing system may update, in accordance with the error metric, at least one of the first set of parameters of the encoder-decoder block, the second set of parameters of the confidence map generator, and the third set of parameters of the localization map generator of the feature detection model.

In some embodiments, the training dataset further may include a first weighted map derived from the first biomedical image. The first weighted map may identify a weight for the confidence score for each pixel as correlated with the one or more features. In some embodiments, the feature detection model may include a weighted map generator having a fourth set of parameters to generate a second weighted map using the feature map. In some embodiments, the computing system may determine the error metric based on comparing between the first weighted map and the second weighted map.

In some embodiments, the training dataset may include a label identifying one or more first points corresponding to the one or more features in the sample biomedical image. In some embodiments, the computing system may apply an accumulator to the second confidence map and the second weighted map to generate a resultant map. The resultant map may identify one or more second points correlated with the one or more features. In some embodiments, the computing system may determine the error metric based on comparing between the one or more first points and the corresponding one or more second points.

In some embodiments, the computing system may determine a first error component based on comparing between the first confidence map and the second confidence map. In some embodiments, the computing system may determine a second error component based on comparing between the first localization map and the second localization map. In some embodiments, the computing system may determine the error metric based on a weighted combination of the first error component and the second error component.

In some embodiments, the encoder-decoder block of the feature detection model may include at least one of an up-sampler connected with a de-convolution block and a down-sampler connected with a convolution block to maintain information related to the one or more features in the sample biomedical image.

In some embodiments, the training dataset may include the sample biomedical image modified in accordance to a data augmentation scheme including at least one of a vertical mirroring, a horizontal mirroring, and a rotation. In some embodiments, the training dataset may include a plurality of sample biomedical images. Each of the plurality of sample biomedical images may be derived from a tissue sample via a histopathological image preparer. The one or more features in each of the plurality of sample biomedical images may correspond to one or more cell nuclei in the tissue sample.

At least one aspect of the present disclosure is systems and methods for feature detection in images. A computing system may identify a biomedical image having one or more features. The computing system may apply the biomedical image to a feature detection model. The feature detection model may include an encoder-decoder block having a first set of parameters to generate a feature map corresponding to the biomedical image. The feature detection model may include a confidence map generator having a second set of parameters to generate a confidence map using the feature map. The confidence map may identify a confidence score for each pixel as correlated with the one or more features. The feature detection model may include a localization map generator having a third set of parameters to generate a localization map using the feature map. The localization map may identify at least one of a magnitude and a direction to apply to each pixel of the confidence map. The computing system may generate a resultant map based on the confidence map and the localization map. The resultant map identifying one or more points corresponding to the one or more features. The computing system may provide the one or more points identified in the resultant map for the biomedical image.

In some embodiments, the feature detection model may include a weighted map generator having a fourth set of parameters to generate a weighted map using the feature map. In some embodiments, the computing system may generate the resultant map based on a combination of the confidence map, the localization map, and the weighted map.

In some embodiments, the computing system may add one or more visual markers corresponding to the one or more points to the biomedical image to indicate the one or more features. In some embodiments, the computing system may apply at least one of the magnitude and the direction identified by the localization map to a corresponding pixel of a plurality of pixels of the confidence map.

In some embodiments, the computing system may apply an accumulator to a combination of the confidence map and the localization map. The accumulator may include at least one of a non-maximum suppression operation, a mean-shift operation, and a duplicate-removal operation. In some embodiments, the encoder-decoder block of the feature detection model may include at least one of an up-sampler connected with a de-convolution block and a down-sampler connected with a convolution block to maintain information related to the one or more features in the biomedical image In some embodiments, the computing system may establish the feature detection model using a training dataset. The training dataset may have a sample biomedical image, a sample confidence map derived from the sample biomedical image, and a sample localization map derived from the sample biomedical image.

BRIEF DESCRIPTION OF DRAWINGS

The foregoing and other objects, aspects, features, and advantages of the disclosure will become more apparent and better understood by referring to the following description taken in conjunction with the accompanying drawings, in which:

FIG. 3A shows a comparison of F1 score with respect to various r of the three methods. FIG. 3B shows a comparison of precision-recall curves the three methods. The deep multi-task learning showed better robustness across data types to the hyperparameter (rectangle), and consistently achieves better precision

DETAILED DESCRIPTION

Figure 1A:
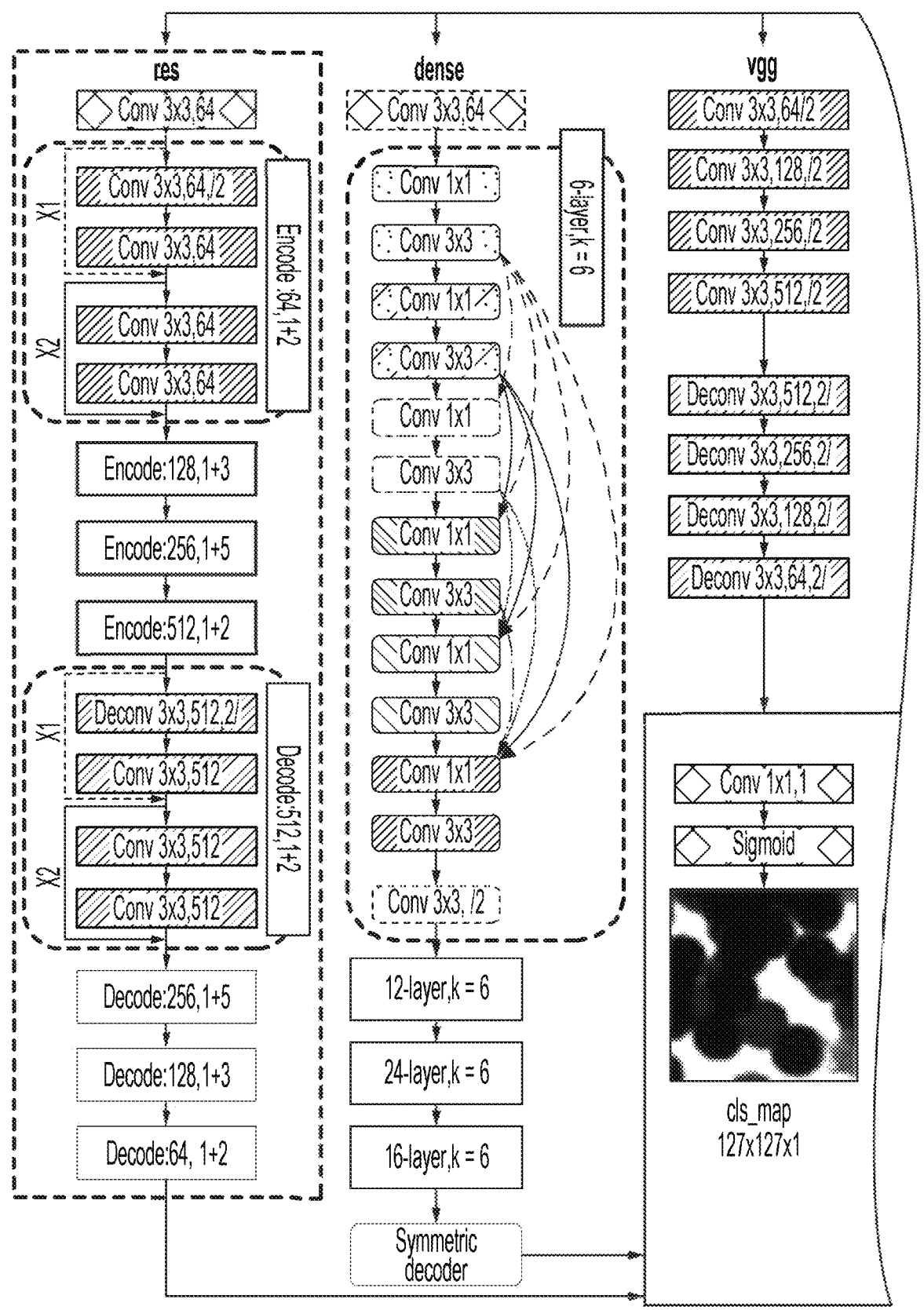
FIGS. 1A and 1B depict a block diagram of an encoder-decoder architecture. The residual encoder-decoder performed best on the validation data and was selected as the backbone.

Presented herein are systems and methods for multi-task learning for dense object detection. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes deep multi-task learning for dense object detection;

Section B describes cell nuclei detection in histopathology images by vector oriented confidence accumulation;

Section C describes systems and methods for feature detection in images; and

Section D describes a network environment and computing environment which may be useful for practicing various embodiments described herein.

A. Multi-Task Learning for Dense Object Detection

Multi-task learning has been shown to be successful for object localization in natural images by jointly recognizing objects and fitting tight bounding boxes. The best examples for localization are the prevailing Fast/Faster-RCNN models and their many variants. In contrast to deep learning work in localization in which usually a few dominant objects are annotated, cell nuclei detection on histopathology slides deals with millions of densely packed small objects per image. At this scale the performance of region proposal based detectors is suboptimal and annotating millions of bounding boxes becomes impractical. To this end, these problems are usually formulated as detection problems based on point labels of the objects' center.

Most deep learning approaches to cell nuclei detection are based on convolutional neural networks that produce accumulator maps of pixel-wise prediction. The final detection of the objects is achieved by identifying the peaks in the accumulator map using mean shift or non-maximum suppression. To explore the scalability, recent approaches to cell detection switched from the traditional sliding-window system to fast auto-encoded regression based on the distance to the nearest cell nucleus. Particularly, to score pixels used a variant of inverse of the distance, while another approach labeled pixels by thresholding. These methods formulated the problem as binary detection which directly detects a certain type of cells and discriminates all other cell types to background.

Another class of studies utilized exhaustive annotation of all cell types to avoid the problem met by binary detection set-ups due to the inter-class similarity of cell morphology. These two-stage detectors explored the fine-grained instance classification on top of non-discriminating recognition of all cells from background. One used two sequential CNNs to learn the two steps. Another jointly trained both steps by employing an RPN-like structure. These algorithms are shown to perform better on detection of certain cell classes on their datasets.

These methods only trained networks for pixel-wise prediction of class confidence, while relied totally on non-maximum suppression to implicitly infer the rough location of nuclei centers. Unlike object detection in natural images, confidence maps produced for the million-scale cell detection by these methods are much denser, on which the peak detection usually takes much longer than network processing, and becomes the rate-limiting step. On the other hand, the pixel-wise confidence map also imposes hardness for peak detection in areas with densely packed cells. Fine-tuning of non-maximum suppression thresholds of IoU is required to obtain good detection results in this case.

Disclosed herein is a novel multi-task deep learning method for cell detection. The model concurrently learns the classification, localization and weight of contribution tasks for all pixels. The accumulator map combined from the three tasks describes accurate and precise nuclei locations. Utilizing the crisp accumulator map for post-processing results in higher detection accuracy and much faster execution speed together with a large scale application for survival analysis in breast cancer. Cell detection is formulated herein as a multi-task deep learning problem and that applies it at scale to predict the clinical outcomes of cancer patients.

Disclosed herein is a novel multi-task learning framework based on deep convolutional encoder-decoder. The model regards all pixels as nuclei position proposals on which the classification, localization and weight of contribution tasks are trained concurrently. The learned task maps are combined intuitively in the detection stage to generate an accumulator map that describes accurate and precise cell locations. A detailed comparison to other methods based on 13,503 manually labeled mononuclear cells (lymphocytes and plasma cells) from both breast and lung showed superior accuracy, execution speed and robustness. To demonstrate performance at scale a retrospective study was conducted on whole slides of 70 patients with triple-negative breast cancer by correlating the mononuclear cell count with disease specific survival. The proposed deep learning model performed equally well as a trained breast pathologist for stratifying high risk from low risk cancer patients.

1. Deep Multi-Task Learning

Presented herein is a novel CNN based deep multi-task learning method for cell detection. Each pixel of a training image was scored with 3 tasks. Let $p_I(i,j)$ be the pixel at coordinate $(i,j)$ of input image I, and $c_I(u,v)$ be the nearest ground truth annotation for a cell nuclei which is at position $(u,v)$. $Cls_I$, $Loc_I$, and $Wt_I$ be the target maps of classification, localization and weight of contribution of image I respectively. First, $$Cls_I(i, j) = \begin{cases} 1, & \text{if } \|p_I(i, j), c_I(u, v)\|_2 < r \\ 0, & \text{otherwise} \end{cases} \quad (1)$$

r is the hyperparameter thresholding the proximity of cells. The classification target map indicates whether each pixel should be regarded as a nucleus. The second task $$Loc_I(i,j) = (Loc_I(i,j,x), Loc_I(i,j,y)) = (u-i, v-j), \text{ if } Cls_I(i,j) = 1 \quad (2)$$

is a tuple describing how many pixels $p_I(i,j)$ needs to move to the location of its assigned ground truth $c_I(u,v)$ in both x and y dimensions. Note that the coordinates of the target and current locations are simply subtracted without additional parametrization, and only pixels assigned as foreground are trained with it. The third task scores $p_I(i,j)$ as:

$$Wt_I(i, j) = \sum_{c_I(u',v')} Z(c_I(u', v')) \quad (3)$$

where $Z(c_I(u',v'))$ is an indicator function of whether a ground truth cell nuclei $c_I(u',v')$ is within Euclidean distance r to $p_I(i,j)$. This task counts the number of cell nuclei that intersect at $p_I(i,j)$ or closer. It was found that the pixels lying in the intersection of cells can be assigned to any of them by the network, depending on the variation of cell morphologies. Therefore Wt may be learned as the weight of each pixel for map combination in the detection stage, which prevents stand-alone cells from accumulating higher prediction confidence than packed cells. Also, it turned out harder for these pixels to learn the localization task as they sometimes lie in between nuclei on the accumulator map. Therefore, Wt may be used to weight the localization loss for training:

$$L_{loc}(I) = \sum_{i,j} Wt_I(i, j) \times \quad (4)$$

$$\begin{cases} 0.5 \times (\widehat{Loc}_I(i, j) - Loc_I(i, j))^2, & \text{if } |\widehat{Loc}_I(i, j) - Loc_I(i, j)| < 1, \\ |\widehat{Loc}_I(i, j) - Loc_I(i, j)| - 0.5, & \text{otherwise} \end{cases}$$

which is a smooth l1 loss to avoid gradient explosion. $\widehat{Loc}_I(i,j)$ is the predicted value at $(i,j)$ on the localization map by the model. The loss between $\widehat{Loc}_I(i,j)$ and the target $Loc_I(i,j)$ is summed over all pixels. The weights $Wt_I(i,j)$ ensured more contribution to the gradient from packed nuclei that are considered hard examples.

Binary cross entropy weighted by the inverse of class frequency ($\alpha_{i,j}$) was used for the classification loss:

$$L_{cls}(I) = -\sum_{i,j} \alpha_{i,j} \quad (5)$$

$$[Cls_I(i, j) \cdot \log \widehat{Cls}_I(i, j) + (1 - Cls_I(i, j)) \cdot \log(1 - \widehat{Cls}_I(i, j))]$$

and also smooth l1 loss for training the weight of contribution map:

$$L_{wt}(I) = \quad (6)$$

$$\sum_{i,j} \begin{cases} 0.5 \times (\widehat{Wt}_I(i, j) - Wt_I(i, j))^2, & \text{if } |\widehat{Wt}_I(i, j) - Wt_I(i, j)| < 1, \\ |\widehat{Wt}_I(i, j) - Wt_I(i, j)| - 0.5, & \text{otherwise} \end{cases}$$

The losses are trained concurrently as $$L = L_{cls} + \lambda_1 L_{loc} + \lambda_2 L_{wt} \quad (7)$$

where $\lambda_1$ and $\lambda_2$ are parameters weighting different tasks but were kept at 1 in all the experiments.

2. Network Architecture

An FCN like structure with rich features may be used in decoding part to learn the task maps. This design shared convolutional layers and largely reduced the effective input size from the sliding-window approaches. Unlike most regression methods for cell detection, this network does not autoencode to a segmentation map, but abstracts and decodes distinct features for different tasks. Visualization of those features can be an intriguing experiment but beyond the scope of this work, however examples of the 3 task maps are shown that the present method learned in FIG. 1. The classification map describes the proximity of nuclei as surrounding disks. The localization map looks like a gradient image zeroed at nuclei positions. It tells the pixels in bright areas to move in the negative direction and those in dark side to go positive. The last map correctly up-weighted the pixels at nuclei intersections. All colors were inverted for visualization.

This model takes input of size 127×127 and feeds it forward to 4 encoding and 4 decoding blocks followed by 3 1×1 conv layers to produce the task maps. Although it is emphasized that this approach achieved better results than the other approaches not by innovations in network design but due to jointly learning the three novel tasks which are more invariant to the inter-/intra-class variances in cell morphology, combinations of residual, dense and single conv layers (vgg) were tried as the building blocks for the encoder-decoder (cf. FIG. 1). Other variations such as separate decoders for each task (vgg-split), skip connections between symmetric encoder and decoder layers (vgg-skip) etc. were also tried. The whole model thus varies from 8 (vgg) to 107 (dense) layers. All pooling and up-sampling was achieved by 3×3 conv/deconv layers at stride 2. On top the last 1×1 conv layers, sigmoid may be used as the activation function for classification map, since it is more stable to the binary cross entropy loss $L_{cls}$. Identity activation was used for localization map as it requires learning of both negative and positive regression targets. For the weight of contribution map ReLU may be selected as the activation to learn the positive cell counts.

3. Multi-Task Detection

In detection stage, the predicted task maps are combined intuitively to generate an accumulator map. Let P be a map initialized with zeros. For every coordinate $(i,j)$, if $Cls(i,j) > 0.5$, which means the pixel is classified as a cell, the localization map tells the corrected location of this cell:

$$i' = i + Loc(i,j,x), j' = j + Loc(i,j,y) \quad (8)$$

The map P is then accumulated with it by:

$$P(i',j')=P(i',j')+Wt(i,j)\times Cls(i,j) \quad (9)$$

Each pixel's contribution is weighted by Wt as discussed in 2.1. Note that the contribution of any pixels with Cls(0) <0.5 may be disregarded. The generated map P is an accumulation of predicted nuclei that moved to their accurate locations. Non-maximum suppression was performed to detect the peaks in P to output the final detection results.

4. Data Collection and Implementation Details

Whole slides were collected from 70 patients diagnosed with triple negative breast carcinoma (TNBC) and had an attending pathologist labeled representative tumor stroma areas. 41 image patches of size 700×700 at 20× magnification were randomly cropped from the slides of 4 breast cancer patients, and 23 from 6 lung cancer patients. Two pathologists that expertise in each cancer type were asked to labeled all mononuclear cells (lymphocytes and plasma cells) independently by placing a dot at nuclei centers. There are in total 7641 mononuclear cells from breast and 6042 from lung labeled. The two datasets are randomly split as 23, 9, 9 and 12, 5, 6 for training, validation and test data respectively. Smaller images of size 127×127 were further cropped from these datasets by a uniform grid of stride 17 as the model inputs.

The network was implemented with PyTorch. A batch size 8 and learning rate 0.0005 was used with a decay factor of 0.1 after every 3 epochs. A momentum of 0.9 was used. For data augmentation, in each epoch, input images have 50% chance to be flipped horizontally and then 50% chance to be flipped vertically, finally equal chances to be rotated by 0°, 90°, 180° and 270° counterclockwise. The encoder-decoder model with residual blocks of depth can be trained on a single GPU within 4 hours for 10 epochs.

5. Experiments and Results (A) Backbone Selection for Method Comparison

While the two-stage multi-class detectors proved better results than binary detection, it requires exhaustive multi-class annotation of cells which is not as frequently performed as single class annotation in practice due to medical purposes. Therefore although the classification branch is replaceable by fine-grained classification modules, the focus may be on binary detection for it can be applied to million scale lymphocyte detection on whole slides which produces clinical-relevant results for patient survival analysis.

TABLE 1

Comparison of different encoder-decoder architectures for multi-task learning

| Block/architecture type | residual | dense | vgg | vgg-split | vgg-skip |
| --- | --- | --- | --- | --- | --- |
| Classification accuracy | 0.851 | 0.865 | 0.835 | 0.839 | 0.845 |
| Localization loss | 5.162 | 5.007 | 5.194 | 5.181 | 5.259 |
| F1 score (lung) | 0.676 | 0.660 | 0.636 | 0.621 | 0.632 |
| F1 score (breast) | 0.583 | 0.581 | 0.548 | 0.547 | 0.530 |

To compare the proposed method to other approaches, the methods from those other approaches were adopted to this set-up by replacing the multi-task maps with their single regression map. All other implementation details including the backbone architecture were kept the same otherwise discussed. The scoring strategy for regression map P in a first approach is a variant of inverse of the distance between pixels to the nearest annotated nuclei:

$$P_I(i,j) = \begin{cases} \frac{1}{(1+\alpha \times \|p_I(i,j), c_I(u,v)\|_2)}, & \text{if } \|p_I(i,j), c_I(u,v)\|_2 < r \\ 0, & \text{otherwise} \end{cases} \quad (10)$$

While in a second approach double-thresholded the distance to get a different regression map:

$$P_I(i,j) = \begin{cases} 1, & \text{if } \|p_I(i,j), c_I(u,v)\|_2 < \frac{r}{2} \\ 0.5, & \text{if } \frac{r}{2} \leq \|p_I(i,j), c_I(u,v)\|_2 < r \\ 0, & \text{otherwise} \end{cases} \quad (11)$$

Other approaches are all viewed as variants of these two methods thus not re-implemented. For example, the same formula was used in detection step with a different $\alpha$. The value a may be kept as 0.8 for the method as the original implementation, and varied r for comparison of model robustness across the two datasets.

To select the backbone, the training and detection results of different encoder-decoders of this multi-task learning method on validation datasets were compared. The balanced accuracy of the binary classification of all pixels were calculated. Also compared were the localization loss which turned out to be in l2 form since greater than 1. These two metrics were calculated by training the model on the combined breast and lung datasets. Then the trained model were used to perform detection on each dataset and calculated the maximum F1 scores respectively. All metrics were measured epoch-wise and the hyperparameter r was set as 15. The dense encoder-decoder performed the best in training, however the top detection results on validation data were achieved by the residual encoder-decoder, which was chosen as the backbone for comparison with other approaches.

(B) Accumulator Maps and Qualitative Results

Figure 2A:
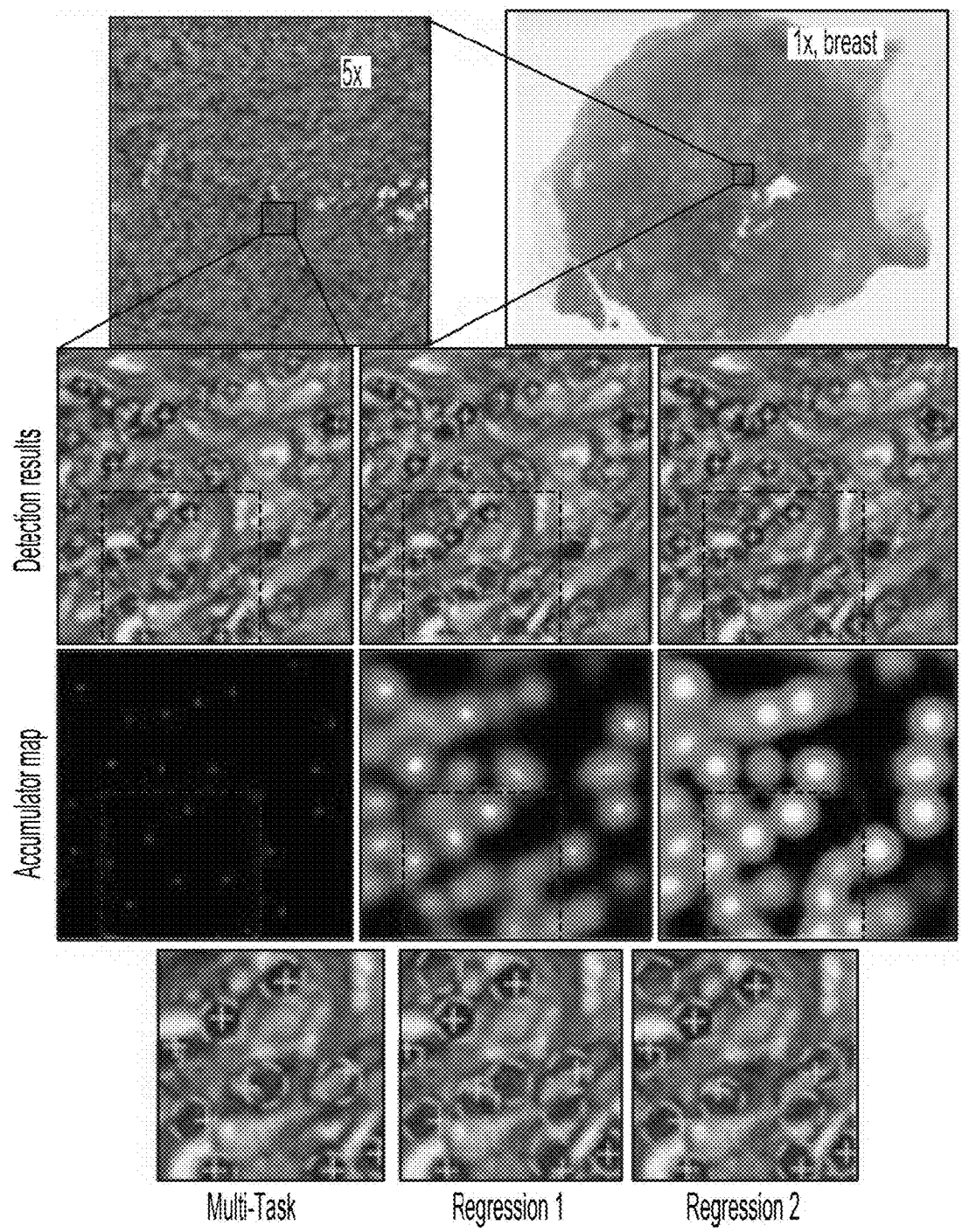
FIGS. 2A and 2B depict accumulator maps and cell detection results of the three methods on both breast and lung cancer slides. Accumulator maps were shown as heatmaps for visualization. Green crosses and yellow circles represent the ground truth labels and the detection results respectively. The deep multi-task learning method produces profoundly peaked accumulator maps for robust post-processing. Detection results show better discrimination between mononuclear cells and other cell types (rectangle region), and more accurate and precise prediction of nuclei locations
Figure 2B:
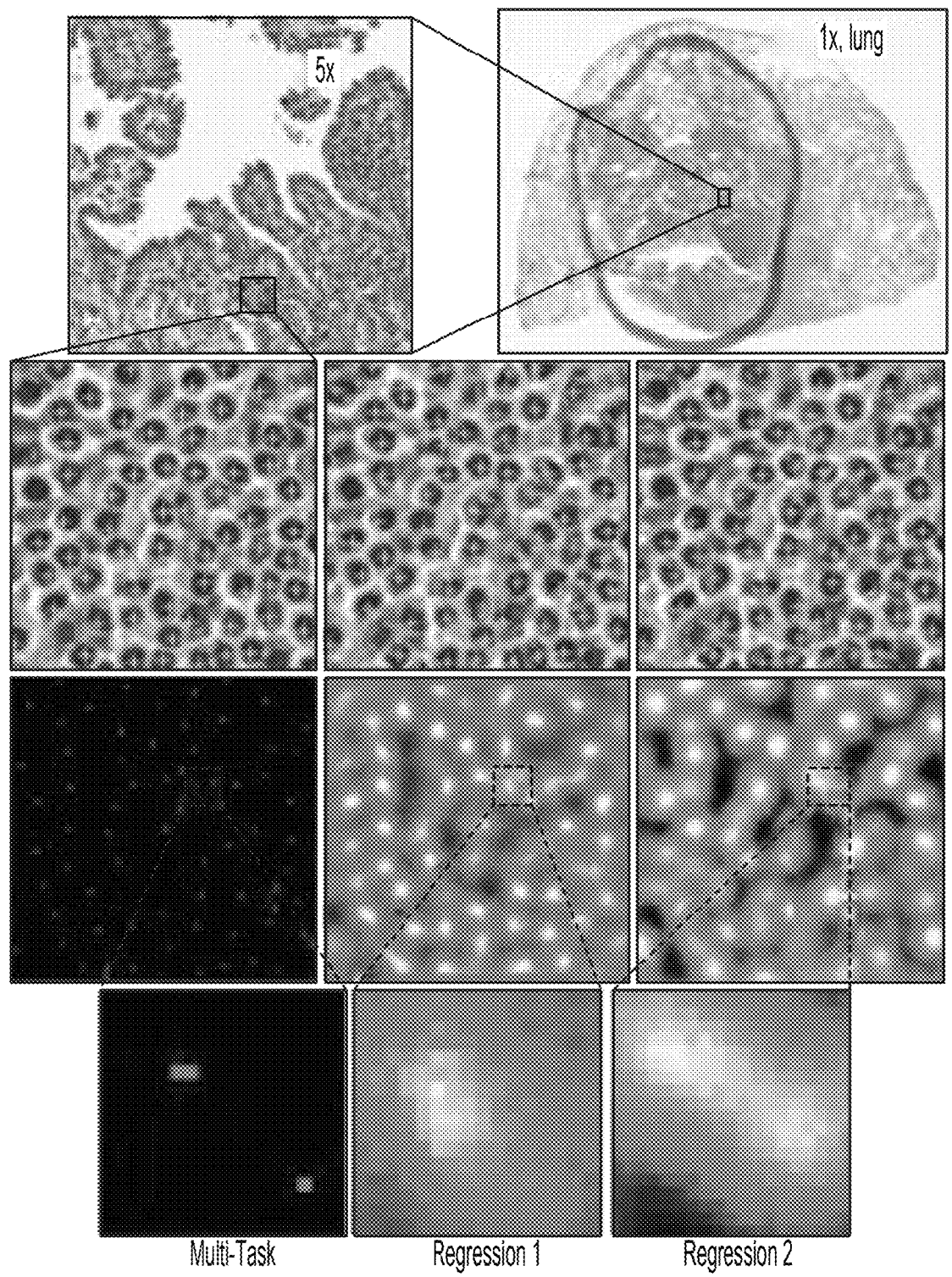

FIG. 2 compares the accumulator maps and qualitative detection results generated by this multi-task learning algorithm and the two other methods. All these results were obtained from the best model on the validation datasets for each method. Dashed yellow circles represent the location of nuclei predicted with confidence higher than the threshold that gives the best F1 score. The green crosses are ground truth annotation of mononuclear cells by pathologists. Breast and lung tissue slides are presented to show the difference between the two datasets and the scale of study. The region represented by the white rectangle on the breast slide shows the better discrimination between mononuclear cells and other cell types by the method. Note that the false positive pixels predicted with high confidence (top left and bottom right in the white rectangle region of the accumulator maps) by simple regression methods are completely dark in the map.

On the right presented is a region of lung cancer slide with densely packed nuclei. The detection result of this method appears to describe nuclei locations much more accurately (yellow circles are more centered at the green crosses) and precisely than the other methods in this area. The accumulator maps of this method are profoundly peaked and clean. The zoomed-in region shows the peaks with only 2-pixel level error, which is consistent with the epoch-wise localization loss as 5.07 in l2 form (cf. Table 1). Unlike the robustness of the multi-task learning approach, the parameter thresholding IoU of non-maximum suppression is critical for some approaches to obtain good detection results in these areas.

(C) Quantitative Performance and Robustness

Figure 3A:
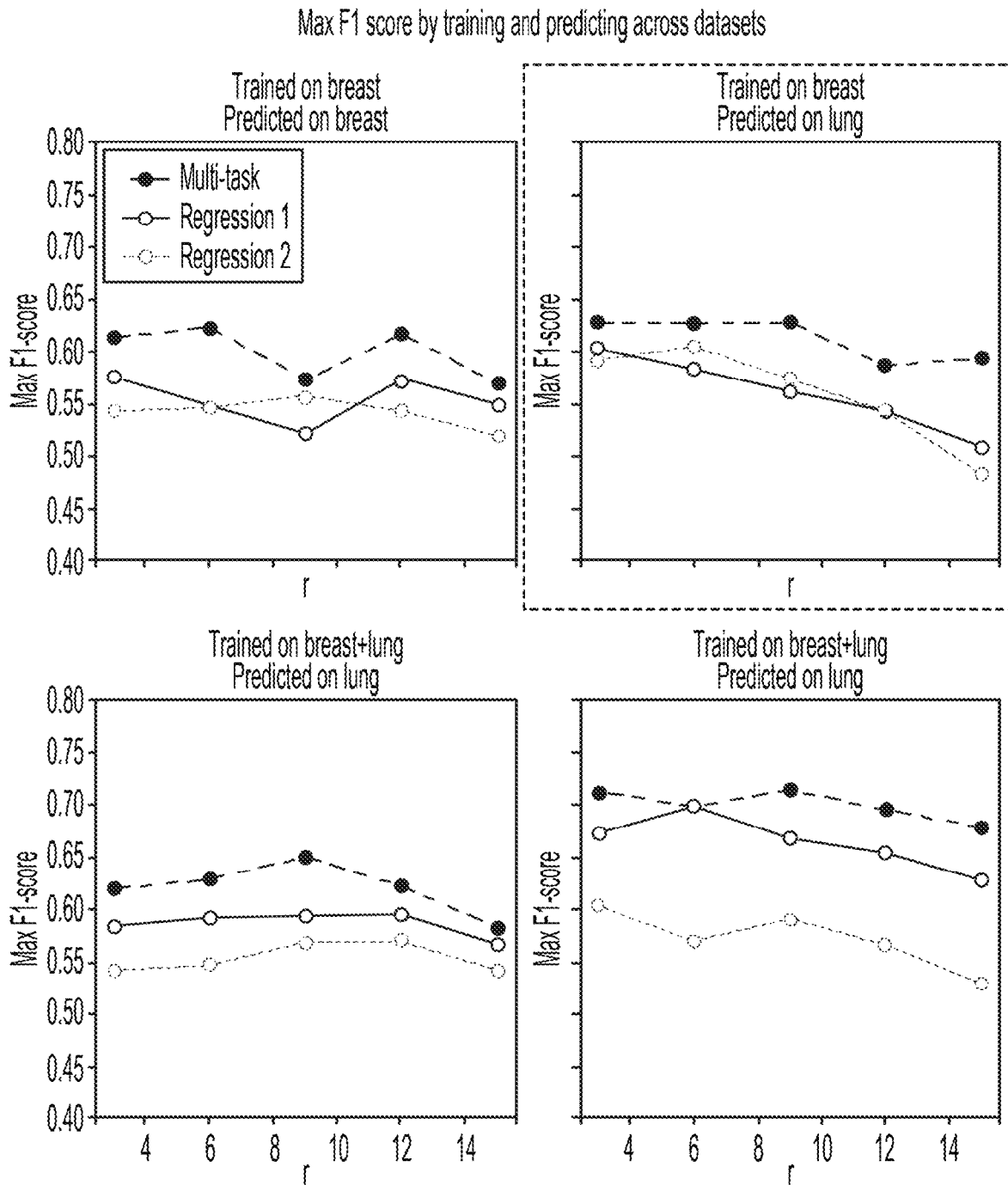
FIGS. 3A and 3B depict line graphs of maximum F1 scores and precision-recall curves.
Figure 3B:
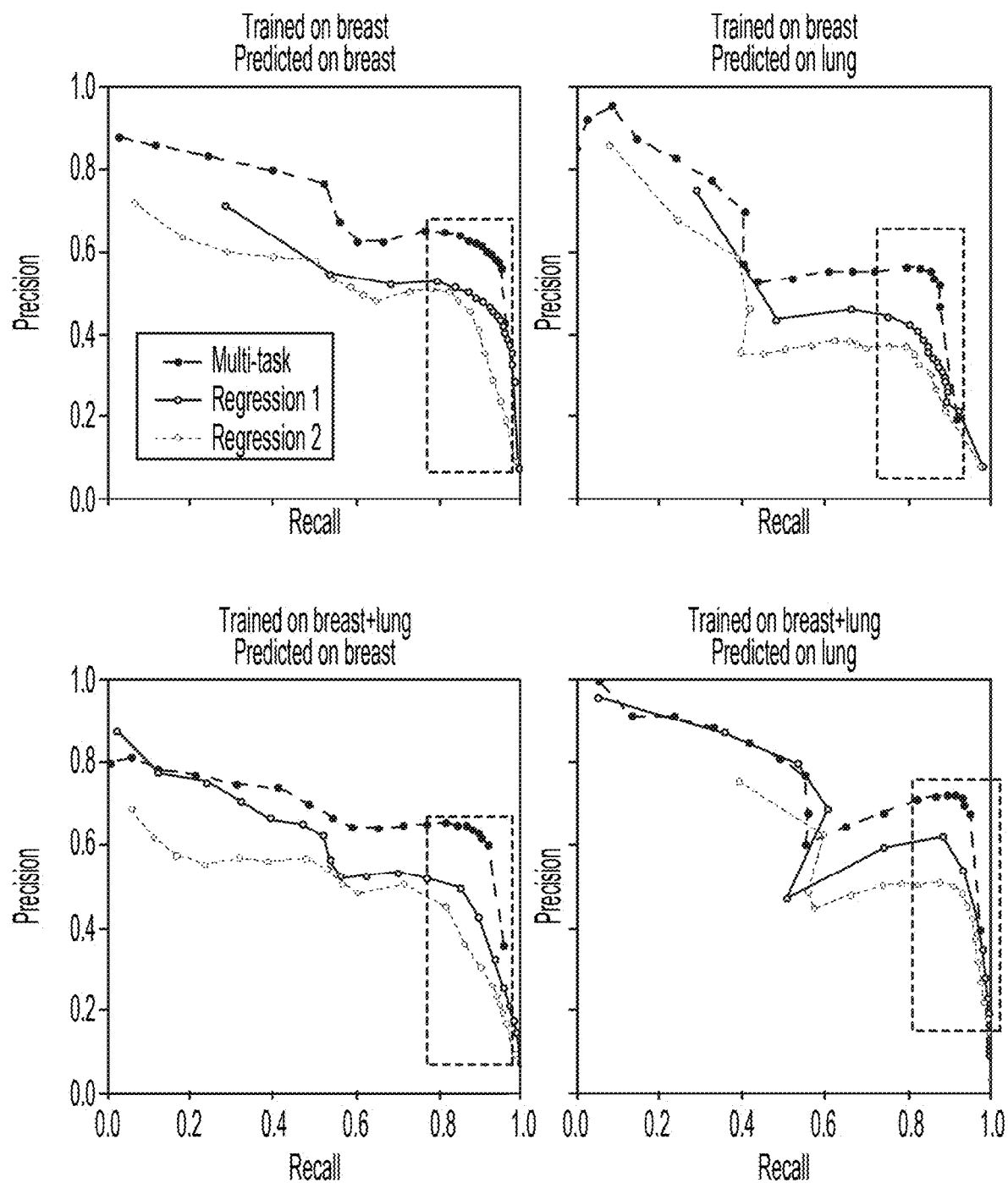

To calculate the precision and recall, detected peaks were assigned to ground truth cell nuclei by Hungarian algorithm and considered true positive if and only if it is within a radius of 6 pixels to their assigned nuclei. This threshold was set for fair comparison between the multi-task learning and the other approaches by alleviating the effect of inaccuracy of position prediction out of the measurement. Precision-recall curves were produced by thresholding the confidence score with a grid of 20. To select the best hyperparameter r, the best F1 score of each method may be measured on the validation data (cf. FIG. 3 left) with r as 3, 6, 9, 12 or 15. The models were trained with breast or breast and lung data and predicted on separated breast and lung datasets. The red-rectangled plot implies better robustness of the model across data types with respect to the hyperparameter r. The precision-recall curves (cf. FIG. 3 right) were then obtained by detection on test datasets with the best models and hyperparameters. The blue rectangles indicates the most popular confidence levels of predictions. Note that the present method consistently achieves better precision than the other approaches across different training/testing set-ups, which indicates less false positive cells to be presented to pathologists in applications.

(D) Execution Speed

Figure 4:
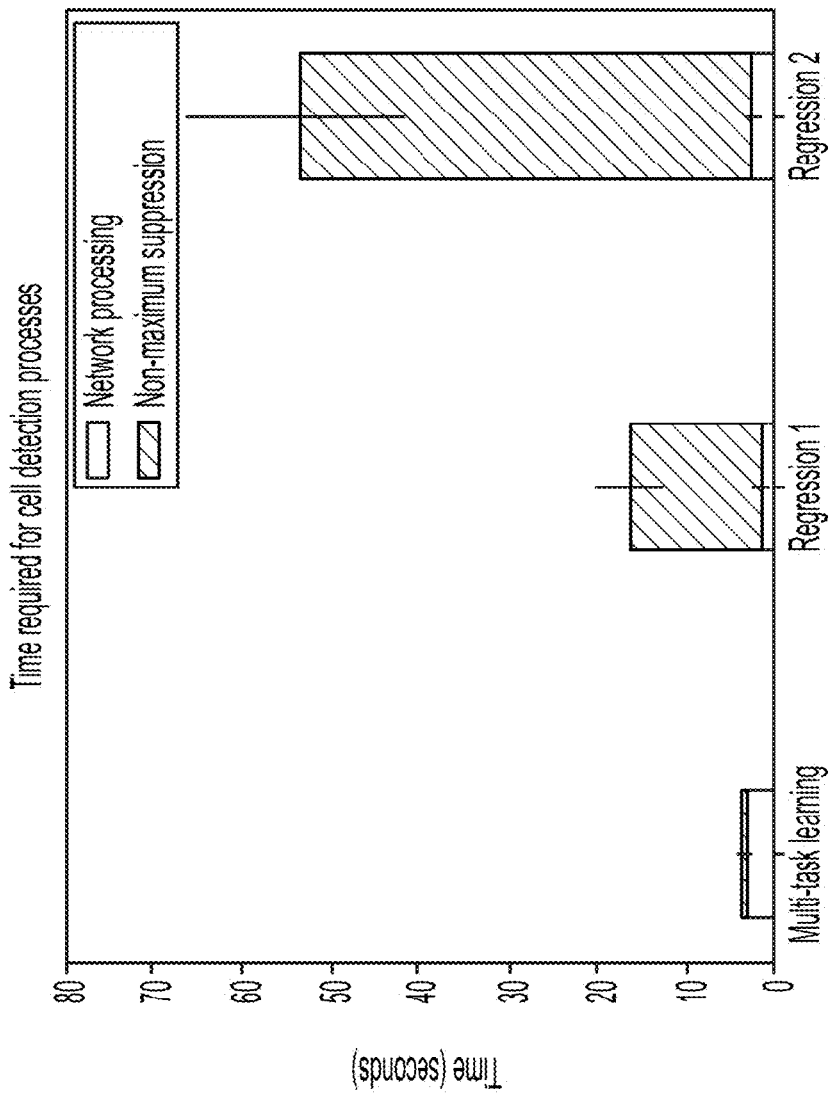
FIG. 4 depicts bar graphs of time for cell detection processes. Comparison of the execution speed of the three methods. The time required for network processing and post-processing (non-maximum suppression) for 36 image frames were measured.

Execution speed is critical for cell detection algorithms towards real-time decision support application. FIG. 4 shows a detailed timing analysis for network processing followed by post-processing (non-maximum suppression) to detect nuclei centers. The post-processing speed is slow for pixel-wise dense detection thus invisible in frame-per-second (fps). Therefore the time required to process 36 frames were compared for better visualization. Note that the combination of these multi-task maps leads to a longer network processing time, however it results in a crisp accumulator map that largely expedites the post-processing, since non-maximum suppression has running time as O(ln(n)), where n is the number of pixels with positive intensity in the accumulator map. The method reaches a 5× improvement than the other approaches and requires 3.64 seconds on average per 36 frames, which is 10 fps. The speed is already comparable to Faster-RCNN (18 fps) on PASCAL VOC 2007, which detects sparse dominant objects in natural images.

(E) Million Scale Detection and Patient Survival

Tumor infiltrating lymphocytes (TILs) are regarded as indicators of the immune response associated with a tumor. Recent studies indicate that patients with breast carcinomas with marked infiltration by TILs have better outcomes. Accurate assessment of TILs in TNBC is of paramount importance, but its quantification has proven to be challenging. There are guidelines on how to evaluate TILs in breast tumors based on microscopic review of tumor tissue sections, but these guidelines have not been fully validated.

This method was applied to detect all TILs on the collected slides of 70 breast cancer patients and calculated TIL level for each patient as $$\frac{\text{cell count}}{\text{tumor stroma area}}.$$

Figure 5:
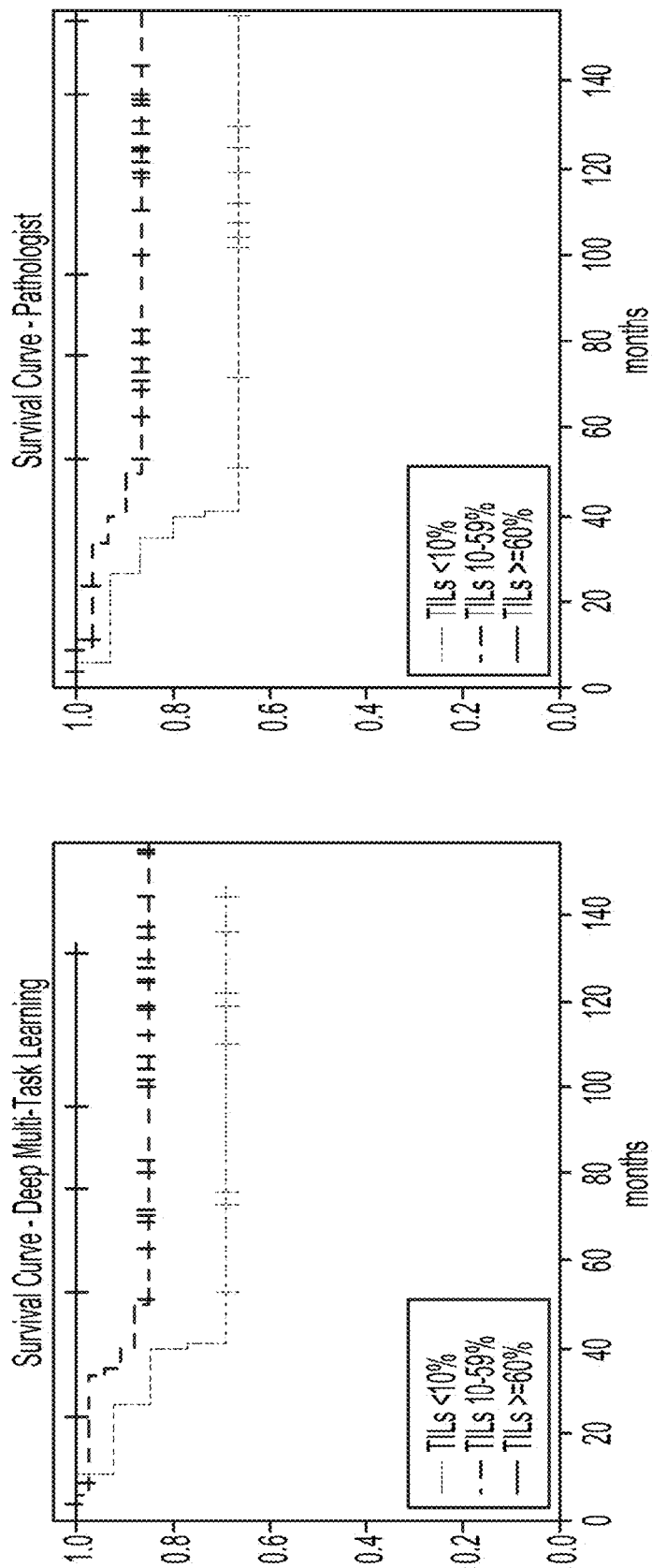
FIG. 5 depicts line graphs of survival curves based on different TIL counts. Left: Deep multi-task learning. Right: Pathologist estimate. The proposed deep multi-task learning framework is able to stratified breast cancer patients into high, medium and low risk equivalently well to trained pathologist.

As this method measures different metric, the TIL level may be normalized to [0,1] and compared with pathologists' independent estimation of TIL level on the same slides. FIG. 4 shows the survival curves by splitting patients based on two thresholds on TIL level. This method effectively stratified breast cancer patients into high, medium and low risk, and took on average <1 min to process one slide. Due the limitation of usable cores and GPU memory, 20×36 image patches of size 762×762 may be processed on parallel. Further memory-wise improvements can lead to faster whole-slide detection. The performance and speed implies high potential of this method to be a reproducible algorithmic approach for TIL level estimation as seen in FIG. 5.

To conclude, disclosed herein is a novel multi-task encoder-decoder algorithm for large scale cell detection on histopathology images. The algorithm concurrently learns pixel-wise classification, localization and weight of contribution tasks that combine into an accumulator map which describes profoundly accurate and precise nuclei locations. Different encoding/decoding CNN blocks and architectures were implemented and compared to obtain the best results. Extensive experiments were performed to validate the efficacy of the proposed frame work and proved higher detection precision, faster execution speed, and more robustness to both training and post-processing hyperparameters across different data types than the other approaches. When applied to million-scale detection of mononuclear cells on whole slides of triple negative breast cancer, the approach performed equally well to trained pathologists on stratifying patients into prognosis risk groups, which implies high potential of a real-time decision support application for various clinical and research purposes.

B. Cell Nuclei Detection in Histopathology Images by Vector Oriented Confidence Accumulation 1. Introduction Object detection in natural images has been defined as fitting tight bounding boxes around recognized objects. The best examples are the prevailing Fast/Faster-RCNN models and closely related techniques. Cell nuclei detection on histopathology slides requires identification of millions of densely packed small objects per image. This is in contrast to these earlier deep learning works in which usually a few dominant objects are annotated. Due to the several orders of magnitude increase in numbers of objects detected per image, the performance of region proposal based detectors is sub-optimal on cell detection in histology images. Further, obtaining annotation of thousands of nuclei bounding boxes is impractical due to the common case of weak nuclei boundaries and high workload of pathologists. To this end, these problems are usually formulated as predicting the (x,y) coordinates of the objects' center supervised by point labels.

Most deep learning approaches to cell nuclei detection are based on convolutional neural networks that predict the probability of each pixel being a nucleus centroid. The final detection of the objects is achieved by identifying the peaks in the probability map using mean shift or non-maximum suppression. Fast auto-encoded regression has recently been employed as a technique to explore improved speed and scalability in cell detection over the traditional sliding-window system. Current methods are designed to recognize the cell nuclei and rely on post-processing and ad hoc fine-tuning to implicitly infer cell locations, which leads to accumulation of localization error as the number of detected objects gets larger. It is emphasized that while the challenging cell detection is not a clinically useful end as a stand-alone task, the accurate coordinates of cell nuclei are simply the prerequisite for many downstream applications (e.g.

multi-class cell detection for tumor micro-environment analysis, tumor architecture, etc.).

To solve this problem, presented herein is a novel multi-task deep learning method for cell detection. Based on convolutional encoder-decoder, the model concurrently learns 1) binary confidence score, 2) localization vector and 3) weight of contribution for each pixel. In detection stage, the confidence scores are weighted and accumulated to the positions pointed by the localization vectors. This method is called vector oriented confidence accumulation (VOCA). It is demonstrated that the three closely correlated but distinct tasks are mutually beneficial when trained as an integrated model (Section 5(A)). VOCA explicitly learns the location of nuclei centroid and thus produces profoundly peaked accumulator maps which describe accurate and precise nuclei locations, and enables fast and robust post-processing (Section 5(B)). Comparison experiments based on a publicly available colorectal cancer dataset shows that the proposed method outperforms the existing methods in terms of F1 score for cell detection, and gives significantly higher nuclei localization accuracy (Section 5(C)).

2. Context

Early attempts at cell nuclei detection utilized human expert-designed features describing intensity distribution and morphological patterns. It is notable that many of these works confabulate the related but separate concepts of nuclei detection and segmentation. This confusion is likely because hand-crafted features are often shape oriented. These approaches tend to be brittle due to the significant heterogeneity of histology slides and cellular morphology and require additional engineering and tuning between different datasets.

Other approaches employing deep learning for cell nuclei detection have achieved state-of-the-art results. One utilized deep neural network to differentiate between mitotic nuclei and background. Other approaches learned unsupervised features via auto-encoders for cell detection, by combining hand-crafted features with deep learning. While object detection at its heart is the combination of object recognition and localization, these works depending on pixel-wise binary classification only considered the first task. Another approach proposed a structured regression approach to predict the probability of each position being a nucleus centroid. Their regression targets embedded the localization information by formulating the score as a function of the distance (d) between each pixel and the nearest ground truth nucleus. This spirit of integrating the two tasks was also followed by many other works. For example, another approach labeled pixels for lymphocytes detection by thresholding d. Another approach proposed a spatially constrained CNN (SC-CNN) regressing to a similar map and published a dataset for nuclei detection on colorectal cancer images. Another approach developed a sibling fully convolutional network (FCN) architecture for simultaneous cell detection and fine-grained classification. Another approach proposed a framework to deconvolve filter-mapped CNN output for cell detection on lung cancer slides. Considering the variation in nuclei size, another approach formulated each nucleus as a Gaussian peak with a maximum value on its centroid, and directly regress the means and standard deviations with a small image patch as input. Another approach utilized additional annotation to combine shape priors with deep features for cell detection. Notably, another approach learned features by correlation filters and achieved state-of-the-art performance for nuclei detection on the previously mentioned colorectal dataset against which several of the above mentioned works were benchmarked. In contrast to these works, VOCA formulates the cell nuclei detection problem as a multi-task approach, which disentangles rather than integrates the objectives, hypothesizing that simpler objectives can potentially improve model training and understanding.

3. Method (A) Deep Multi-Task Learning

A novel CNN based deep multi-task learning method is proposed for cell detection. Each pixel of a training image is scored with 3 tasks. Let $p_I[i,j]$ be the pixel at coordinate (i,j) of input image I, and $c_I[u,v]$ be the nearest ground truth annotation for a cell nuclei which is at position (u,v). $Conf_I$, $Loc_I$, and $Wt_I$ be the target maps of confidence score, localization vector and weight of contribution of image I respectively. First, $$Conf_I(i, j) = \begin{cases} 1, & \text{if } \|(u-i, v-j)\|_2 < r \\ 0, & \text{otherwise} \end{cases} \quad (1)$$

r is the hyperparameter thresholding the proximity of cells. The confidence score target map indicates whether each pixel should be regarded as a nucleus. The second task $$Loc_I[i,j] = (u-i, v-j), \text{ if } Conf_I[i,j]=1 \quad (2)$$

is a vector describing the direction and magnitude that $p_I(i,j)$ needs to move to the location of its assigned ground truth $c_I(u,v)$. Note that only pixels labeled as foreground by the confidence map ($Conf_I[i,j]=1$) are trained with this task. The third task scores $p_I[i,j]$ as:

$$Wt_I[i,j] = \Sigma_{c_I[u',v']} \mathbb{1}_{\|(u'-i,v'-j)\|_2 < r}(c_I[u',v']) \quad (3)$$

where $\mathbb{1}_{\|(u'-i,v'-j)\|_2 < r}(c_I[u',v'])$ is an indicator function of whether a ground truth cell nucleus $c_I[u',v']$ is within euclidean distance r to $p_I[i,j]$. This task counts the number of cell nuclei that intersect at $p_I[i,j]$. Since the pixels lying in the intersection of cells are shared in confidence accumulation (cf. Section 3(C)), their contribution should be up-weighted accordingly by Wt.

Binary cross entropy weighted by the inverse of class frequencies is used as the loss function for confidence score ($L_{conf}$). Smooth l1 loss for localization vector and weight of contribution ($L_{loc}, L_{wt}$) may be used to avoid gradient explosion. The joint loss function is a linear combination of the three losses:

$$L = L_{conf} + \lambda_1 L_{loc} + \lambda_2 L_{wt} \quad (4)$$

where $\lambda_1$ and $\lambda_2$ are parameters weighting the contribution of different tasks. Both $\lambda_1$ and $\lambda_2$ may be kept at 1 in all of the experiments unless discussed (cf. Section 5(A)).

(B) Network Architecture

Figure 6:
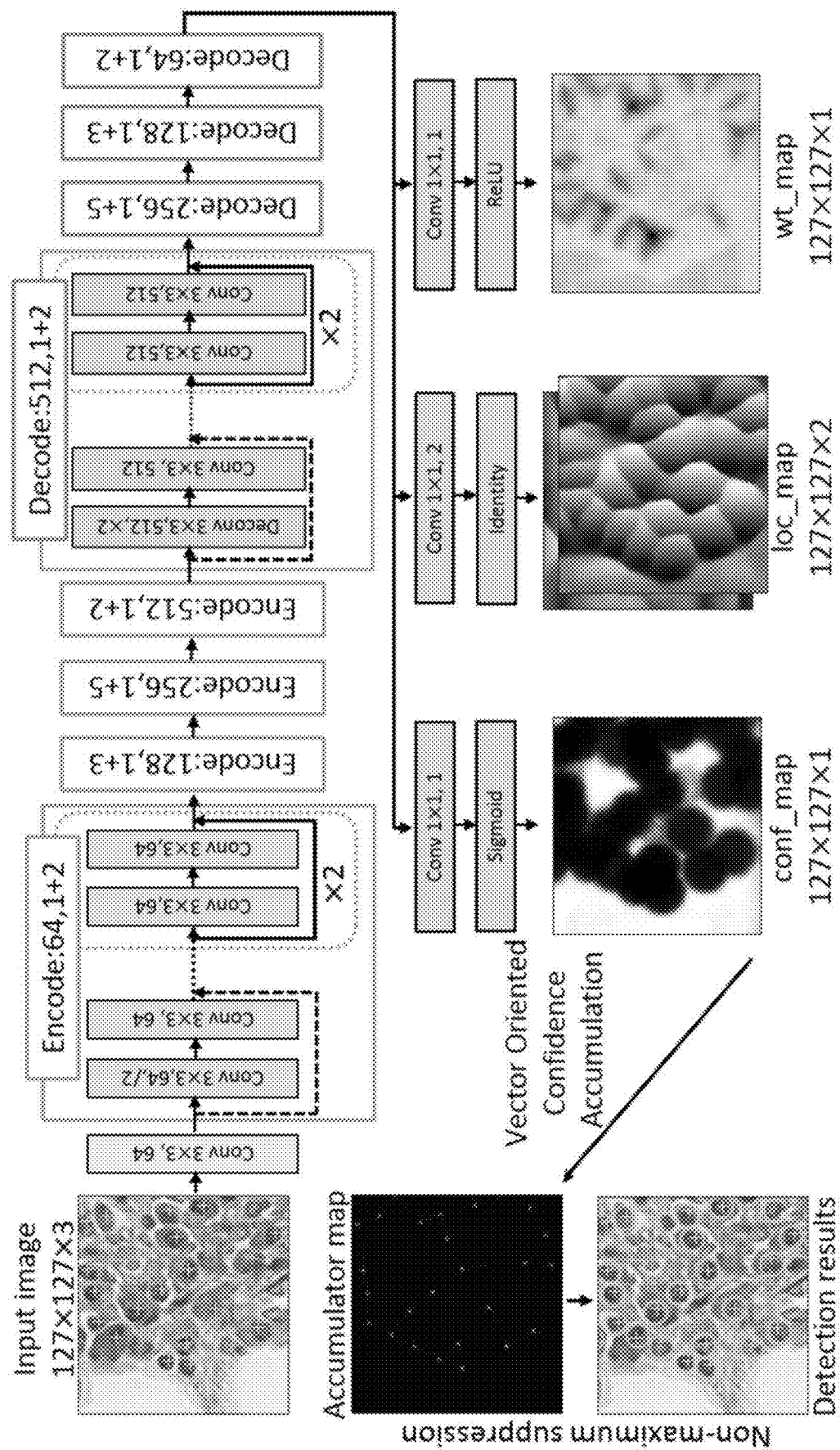
FIG. 6: Residual encoder-decoder architecture of the proposed method.

Instead of computing a small patch around each pixel in the sliding-window manner, an FCN-like structure is used with rich features in the decoding part to learn the task maps. This design shared convolutional layers and largely reduced the effective input size from the sliding-window approaches. The network abstracts and decodes distinct features for different tasks. The bottom panel of FIG. 6 shows the 3 task maps. The confidence score map describes the proximity of nuclei as surrounding disks. The localization vector map is composed of two gradient images zeroed at nuclei position in both x and y dimensions. The last map correctly up-weighted the pixels at nuclei intersections. All colors were inverted for improved visualization.

The proposed model takes input of size 127×127×3 and feeds it forward to 4 encoding and 4 decoding blocks followed by 3 1×1 cony layers to produce the task maps.

Residual layers are used for each block of the encoder-decoder (cf. FIG. 6). Rather than max pooling, down/up-sampling was conducted within every block by 3×3 conv/deconv layers at stride 2 to retain location information. Changing the receptive field size of the last encoding block by either decreasing or increasing the number of encoding blocks degraded the detection performance in the experiments. It is surmised that having a receptive field that is approximately the size of cell nuclei (16×16) on cancer slides at 20 magnification allows the network to learn higher level semantics useful for the tasks. On top of the last 1 1 cony layers, a sigmoid activation may be used for confidence score maps, since it is stable to the binary cross entropy loss $L_{conf}$. Identity function was employed as the activation to account for both negative and positive values of the regression target. For the weight of contribution map, ReLU was selected as the activation to learn the positive cell counts.

(C) Vector Oriented Confidence Accumulation

In detection stage, the predicted task maps are combined intuitively to generate an accumulator map (cf. FIG. 6). Let P be a map initialized with zeros. For every coordinate (i,j), the localization vector accumulates the weighted confidence score of pixel to the target position:

$$P[i',j']=P[i',j']+Wt[i,j]\times Co\hat{n}f[i,j], \text{ where } (i',j')=(i,j)+Loc[i,j] \quad (5)$$

The confidence accumulation amplifies the stratification between fore-ground and back-ground and produces sparse response, which enhances the speed and robustness of the follow-up non-maximum suppression on P to output the final detection results.

4. Dataset and Implementation Details

The proposed method is validated on a colorectal cancer dataset. The dataset contains 100 images of size 500×500 at 20× magnification, which were cropped from 10 whole-slide images of 9 patients with colorectal adenocarcinomas. On these images there are in total 29,747 cell nuclei marked at/around the center. The dataset is split for 2-fold cross validation.

The network was implemented with PyTorch. Images of size 127×127 were further cropped from the dataset by a uniform grid of stride 17 for translational augmentation and to match the model input size. A batch size 8 and learning rate 0.0005 with a decay factor of 0.1 after every 3 epochs is used. A momentum of 0.9 was used. Input images were normalized by the mean and standard deviation calculated on the training dataset. For further data augmentation, each image has 50% chance to be flipped horizontally and then 50% chance to be flipped vertically, finally equal chances to be rotated by 0°, 90°, 180° and 270° counterclockwise. The model was trained on a single GPU within 4 hours for 10 epochs.

TABLE 1

Pixel-wise classification accuracy (Acc) and localization loss ($L_{loc}$) of training configurations with different combinations of losses.

| Configuration | Fold 1 | | Fold 2 | |
| --- | --- | --- | --- | --- |
| | Acc | $L_{loc}$ | Acc | $L_{loc}$ |
| Conf | 0.879 | — | 0.882 | — |
| Loc | — | 3.969 | — | 4.077 |
| Conf + Loc | 0.886 | 3.971 | 0.887 | 4.071 |
| Conf + Loc + Wt | 0.886 | 3.971 | 0.887 | 4.071 |

5. Experiments and Discussion (A) Pixel-Wise Classification Accuracy and Localization Loss The effectiveness of multi-task learning was first evaluated. Different values of the proximity parameter r in Equation (1) were used and set to 12 for all following comparisons, as it gave the best F1 score in the cross validation (cf. Section 5(C)). A pixel $p_I[i,j]$ is classified correctly if Conf[i,j]>0.5 and Conf[i,j]. The pixel-wise classification accuracy (Acc) is then defined as the average accuracy of fore-ground and back-ground pixels since the sample sizes were quite imbalanced. As mentioned before, the localization loss $L_{loc}$ was calculated as the averaged sum of smooth l1 losses of both x and y dimensions for all pixels. In Table 1, the Acc and $L_{loc}$ of different training configurations were presented. Conf+Loc+Wt means that all three losses were trained concurrently. Conf means that only $L_{conf}$ was used for training. The rest configurations are defined in a similar fashion.

The results imply that the three related tasks are mutually beneficial. Especially the classification accuracy was improved if trained together with localization loss. This improvement (from 0.879 to 0.886 for Fold 1, and from 0.882 to 0.887 for Fold 2) was comparable to other optimization of the pipeline. $L_{conf}$ and $L_{wt}$ converges about 3 times faster than $L_{loc}$ during training. It is surmised that regression of localization vector is a more challenging objective therefore contributed more to the learning of common features. Various values of $\lambda_1$ were tried in Equation 4 (while keeping $\lambda_2$ as 1): 0.1, 1, and 10, but 1 resulted in the best performance. A natural extension would be experimentation with more combinations of the weighting parameters $\lambda_1$ and $\lambda_2$. It is notable that the $L_{loc}$ almost falls under 4, which is in l1 form since >1. It means that the average localization error on each dimension is only 2 pixels. This observation is consistent with the crisp accumulator maps in FIG. 7 and the high localization accuracy shown in Table 2.

(B) Accumulator Map And Qualitative Results

Figure 7:
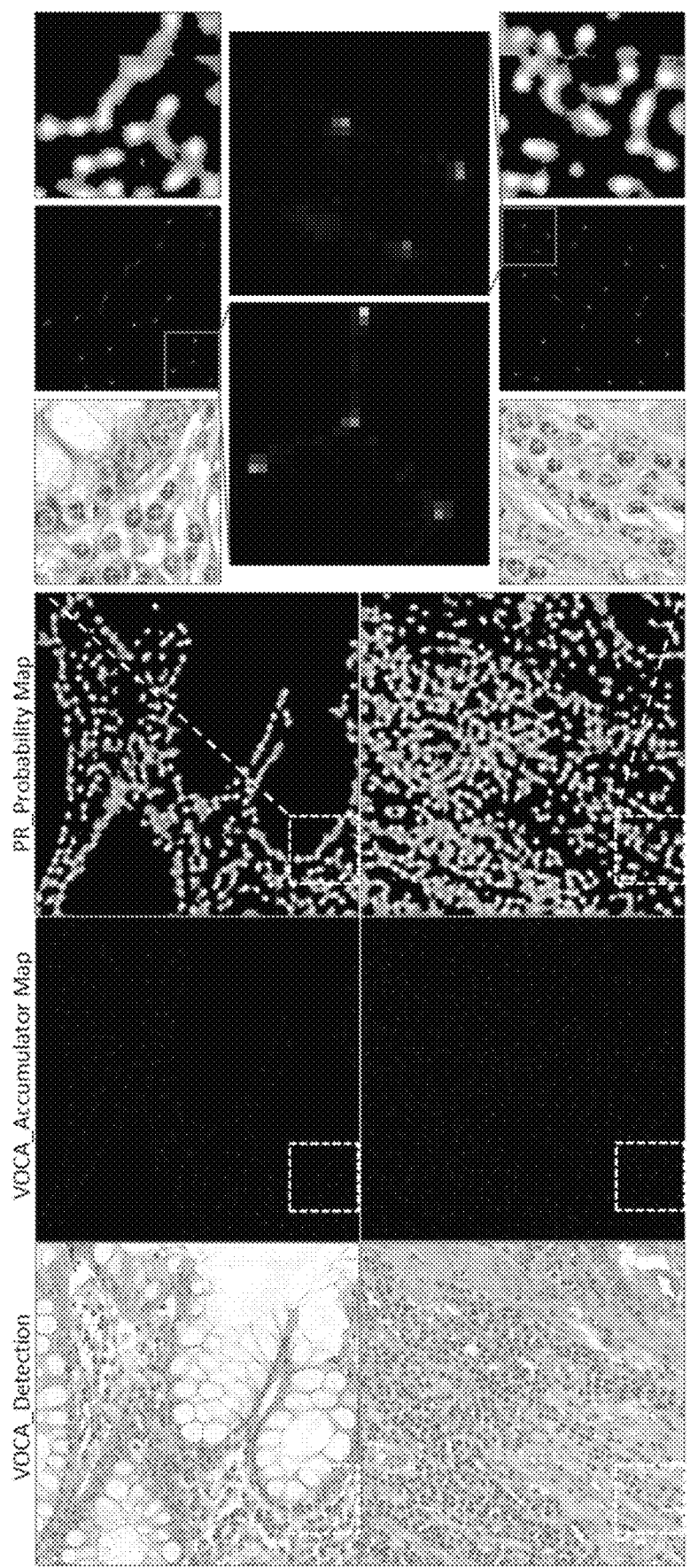
FIG. 7: Accumulator maps and cell detection results of VOCA compared to peak regression (PR). The figure is best viewed on screen with magnification 400%.

In FIG. 7, depicted are the accumulator maps and qualitative detection results generated by VOCA. For comparison, a pixel-wise peak regression model (PR) was implemented. The PR model replaces the multi-task maps of VOCA by a single regression map, in which the pixels are scored as:

$$P_I(i,j) = \begin{cases} \frac{1}{(1+0.8\times \|(u-i,v-j)\|2)}, & \text{if } \|(u-i,v-j)\|_2 < 6 \\ 0, & \text{otherwise} \end{cases}$$

It is a representative of several other methods which also embed recognition and localization to a single map. In detection results (cf. FIG. 7 left panel), the yellow circles represent the predicted location and the green crosses are ground truth annotation. Only predictions above the confidence threshold that gives the best F1 score were shown.

As shown in the zoomed-in panels in FIG. 7, the predicted confidence scores (cf. conf_map in FIG. 6) were accumulated precisely to the target locations. Pixels with high accumulated confidence are within distance of 1 to 2 pixels to the peaks, while the majority of the background becomes zero-valued after confidence "movement". Post-processing on the clean accumulator maps of VOCA is fast. For example, it speeds up non-maximum suppression whose running time is O(ln(n)), where n is the number of positively valued pixels. In the experiments it took on average 0.2 seconds to process each map of size 500×500, which is about 30 times as fast as on the probability maps produced by PR (cf. FIG. 7 mid panel). Besides precision, nuclei localization of VOCA also showed high accuracy as most of the yellow circles (predictions) are rigorously centered at the green crosses (ground truth). The quantitative measurement of the localization accuracy will be presented in Section 5(C).

(C) Quantitative Performance and Localization Accuracy

Non-maximum suppression on the crisp accumulator maps produced by VOCA is not only fast but also robust. A distance threshold of 4 pixels can already suppress most of the non-peak positions. The accumulated scores within 2 pixels of a nucleus coordinate given by non-maximum suppression were summed as its final score. All scores were normalized to [0,1] for each image. The predicted coordinates were then assigned to ground truth cell nuclei by Hungarian algorithm according to euclidean distance to ensure that at most 1 prediction will be considered true positive for each ground truth. The predictions are regarded as true positive if and only if they are within 6 pixels of their assigned nuclei. Precision-recall curves were plotted by thresholding the final scores and obtained the optimal F1 score for comparison with the existing methods validated on the same dataset (cf. Table 2). The corresponding precision and recall were also reported.

TABLE 2

Comparison of precision, recall, F1 score and localization accuracy

| Methods | Precision | Recall | F1 score | Median Distance (Q1, Q3) |
|---|---|---|---|---|
| LIPSyM | 0.725 | 0.517 | 0.604 | 2.236 (1.414, 7.211) |
| SSAE | 0.617 | 0.644 | 0.630 | 4.123 (2.236, 10) |
| SC-CNN | 0.781 | 0.823 | 0.802 | 2.236 (1.414, 5) |
| SP-CNN | 0.803 | 0.843 | 0.823 | — |
| MDN | 0.788 | 0.882 | 0.832 | — |
| SFCN-OPI | 0.819 | 0.874 | 0.834 | — |
| RBF-CF | 0.83 | 0.86 | 0.84 | — |
| VOCA-NW | 0.814 | 0.854 | 0.834 | 2.0 (1.414, 2.236) |
| VOCA | 0.831 | 0.863 | 0.847 | 2.0 (1.414, 2.236) |

The first panel of methods (LIPSyM) were (re-)validated. The second panel includes the reported results on the same dataset of more recent methods described in Section 2. VOCA-non-weighted (VOCA-NW) represents the configuration Conf+Loc (cf. Table 1) in which Wt was not trained and the confidence was thus not weighted for accumulation. "-" means the score is not available from the original paper.

Figure 8:
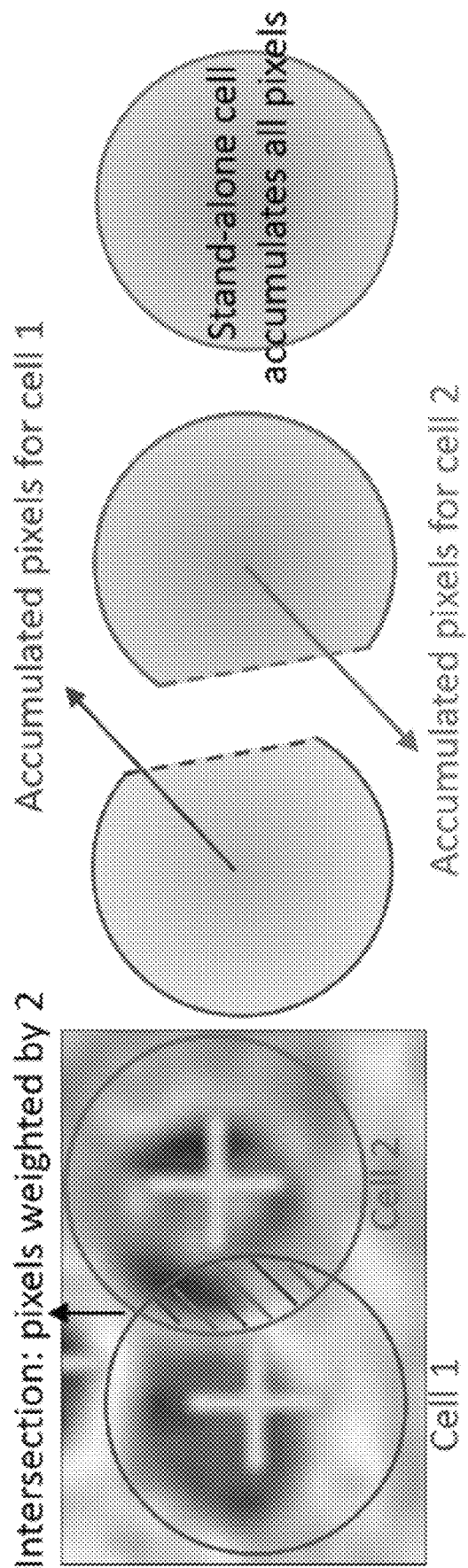
FIG. 8: Pixel sharing during confidence accumulation.

VOCA achieved the best detection performance with F1 score as 0.847. It tends to have higher precision than the other methods at similar recall, which it is surmised is caused by its amplification of the stratification between fore-ground and back-ground by confidence accumulation. As Wt did not help the training (cf. Table 1), the improved performance of VOCA over VOCA-NW should come from the compensatory upweighting for pixel sharing during confidence accumulation. Theoretically VOCA-NW gives lower confidence scores for packed cells, since only a portion of the pixels at their intersections (the dark areas in the Wt map in FIG. 7) are accumulated to them (illustrated in FIG. 8). At certain threshold these cells will be filtered out as background by VOCA-NW while they can be correctly detected by VOCA.

The metrics were measured to quantitatively describe the accuracy of nuclei localization of VOCA. The Euclidean distance between each pair of ground truth and its assigned prediction was recorded for both folds of cross validation. The median, 1st quartile and 3rd quartile of the distribution of the distances were reported. It is emphasized again that the accurate coordinates of cell nuclei are the prerequisite for many downstream applications, such as tumor microenvironment analysis, and that low accuracy cell localization would result in accumulated error which hinders these tasks. Considering the radius of a cell nucleus is only around 6 to 12 pixels at 20 magnification, localization error of 5 pixels may still introduce unignorable problems. VOCA explicitly learns nuclei localization via deep features and significantly reduced the error of 75% of the predictions to below 2.236 pixels.

6. Conclusion

Proposed herein is a novel deep learning algorithm called vector oriented confidence accumulation (VOCA) for large scale cell detection on histopathology images. The algorithm concurrently learns pixel-wise classification, localization and weight of contribution tasks that combine into an accumulator map which describes profoundly accurate and precise nuclei locations. Extensive experiments on a public cell detection dataset of colon cancer validated the efficacy of the proposed frame work and proved high detection performance and exceptional localization accuracy compared to the state-of-the-art, which implies high potential of a robust decision support application for various clinical and research purposes.

C. Systems and Methods for Feature Detection in Images

Figure 9:
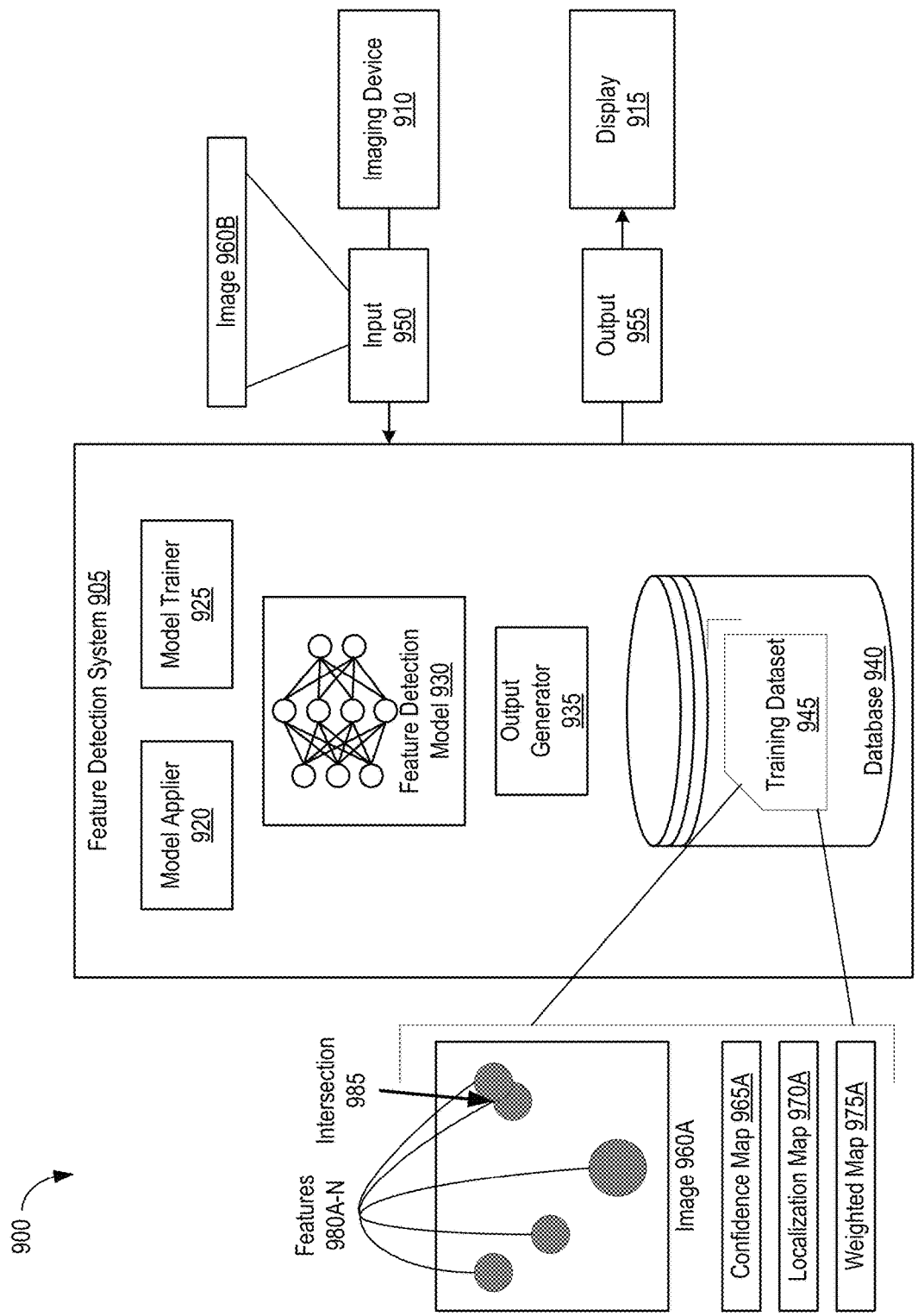
FIG. 9 depicts a block diagram of a system for feature detection in images in accordance with an illustrative embodiment.

Referring now to FIG. 9, depicted is a block diagram of a system 900 for feature detection in images. In overview, the system 900 may include at least one feature detection system 905 (sometimes generally referred to as a computing system), at least one imaging device 910, and at least one display 915, among others. The feature detection system 905 may include at least one model applier 920, at least on model trainer 925, at least one feature detection model 930, at least one output generator 935, and at least one database 940, among others. The database 940 may include or maintain at least one training dataset 945. Each of the components in the system 900 listed above may be implemented using hardware (e.g., one or more processors coupled with memory) or a combination of hardware and software as detailed herein in Section D. Each of the components in the system 900 may implement or execute the functionalities detailed herein, such as those described in Sections A and B.

In further detail, the feature detection system 905 and its components, such as the model applier 920, the model trainer 925, and the output generator 935 may have a runtime mode (sometimes referred herein as an inference mode) and a training mode. In general, under training mode, the feature detection system 905 may train or otherwise update the feature detection model 930 using the training dataset 945 maintained on the database 940. Under runtime mode, the feature detection system 905 may apply the feature detection model 930 using at least one acquired image 960' included in an input 950 of the imaging device 910.

Under training mode, The model trainer 925 may initiate, establish, and maintain the feature detection model 930. The initiation and establishment of the feature detection model 930 may be under training mode, and may be performed using the training dataset 922 on the database 940. To train, the model trainer 925 may access the database 940 to retrieve, obtain, or otherwise identify the training dataset 945 for training the feature detection model 930. The training dataset 945 may include a set of images 960A (sometimes referred to as a sample image). Each image 960A may have a set of pixels in a specified dimension. For example, the image 960A may have be 256×256×1 pixels or 127×127×3 pixels, among others.

In some embodiments, the image 960A of the training dataset 945 may be a biomedical image. The biomedical image may be acquired in accordance with microscopy techniques or a histopathological image preparer, such as using an optical microscope, a confocal microscope, a fluorescence microscope, a phosphorescence microscope, an electron microscope, among others. The biomedical image may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The biomedical image for the image 960A may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject. In some embodiments, the sample image 960A of the training dataset 945 may be another type of image.

Each image 960A may include one or more features 980A-N (hereinafter generally referred to as features 980). The features 980 may correspond to areas, sections, or boundaries within the image 960 that contain, encompass, or include an object. The object may correspond to a portion of information about the content in the image 960A. For example, the image 960A may be a whole slide image (WSI) used for pathology of a tissue sample, and the features 980 may correspond to cell nuclei in the tissue sample. In some embodiments, the image 960A may have or be associated with an annotation label. The annotation label may identify the features 980 in the image 960A. For example, the annotation label may identify pixel coordinates of a centroid of each feature 980 in the image 960A.

In addition, each image 960A of the training dataset 945 may be associated with at least one confidence map 965A (sometimes referred herein as a sample confidence map). The confidence map 965A may also be included in the training dataset 945. The confidence map 965A may specify, define, or otherwise identify a confidence score for each pixel. The confidence score may indicate a level of correlation (e.g., 0 to 1 or −1 to 1) of the pixel as associated with one of the features 980 in the image 960A. The confidence map 965A may be generated, calculated, or derived from the image 960A. For example, the confidence map 965A may have been generated (e.g., manually) to have higher confidence scores for areas in the image 960A identified as corresponding to one of the features 980 and lower confidence scores for other areas of the image 960A.

Each image 960A may also be associated with at least one localization map 970A (sometimes referred herein as a sample localization map). The localization map 970A may also be included in the training dataset 945, and be associated with the confidence map 965A for the image 960A. The localization map 970A may specify, define, or otherwise identify a magnitude or a direction to apply to the confidence score of each pixel in the confidence map 965A. In some embodiments, the magnitude and direction may be defined using a vector for each pixel. For a given pixel identified by the localization map 970A, the magnitude may define a factor (e.g., a multiplicative factor or an adjustment value) to apply the confidence score at the corresponding pixel in the confidence map 965A. The direction for the pixel identified in the localization map 970A may define a shift in pixels (e.g., in any direction) to apply to the confidence score at the corresponding pixel in the confidence map 965A. In some embodiments, the image 960A may be associated with a set of localization maps 970A, with each localization map 970A associated with a respective axis. For example, one localization map 970A may specify the magnitude and the direction along the x-axis, while another localization map 970A may specify the magnitude and the direction along the y-axis. The localization map 970A may be generated, calculated, or derived from the image 960A or the confidence map 965A. For example, the localization map 970A may have been configured (e.g., manually) to have higher magnitudes for areas in the image 960A identified as corresponding to one of the features 980 and lower magnitudes for other areas of the image 960A. In addition, the localization map 970A may have been configured (e.g., manually) to have a lower shift for direction in areas of the image 960A identified as corresponding to one of the features 980 and a higher shift for directions in areas of the image 960A identified as not corresponding to any of the features 980.

Each image 960A may be associated with at least one weighted map 975A (sometimes referred herein as a sample weighted map). In some embodiments, the weighted map 975A may also be included in the training dataset 945, and be associated with the confidence map 965A or the localization map 970A for the image 960A. In some embodiments, the training dataset 945 may lack the weighted map 975A for the image 960A. The weighted map 975A may specify, define, or otherwise identify a weight to apply to the confidence score at each pixel in the confidence map 965A. In some embodiments, the weighted map 975A may identify the weight to apply to the confidence score, subsequent to the application of the magnitude or direction defined by the associated localization map 975A. The weight may take into account of overlap or intersections between one or more features 980 in the image 960A (e.g., as depicted with intersection 985). The weighted map 975A may be generated, calculated, or derived from the image 960A, the confidence map 965A, or the localization map 970A. For example, the weighted map 975A may have been generated (e.g., manually) to have lower weight in areas of the image 960A where there is no intersection or overlap and to have higher weights in areas where there are intersections or overlaps (e.g., intersection 985).

In some embodiments, the model trainer 925 may generate additional training datasets using the stored training dataset 945 in accordance to one or more data augmentation schemes. The data augmentation schemes may include vertical mirroring (also referred herein as a vertical flip), horizontal mirroring (also referred herein as a horizontal flip), and a rotation (e.g., 90°, 180°, or 270°), among others. The model trainer 925 may identify the image 960A from the training dataset 945, along with the confidence map 965A, the localization map 970A, and the weighted map 975A associated with the image 960A. Upon identification, the model trainer 925 may apply one or more of the same data augmentation schemes to the image 960A, the associated confidence map 965A, the associated localization map 970A, and the associated weighted map 975A to generate additional training data. Once generated in accordance with the data augmentation schemes, the model trainer 925 may store and maintain the additional training dataset 45 in the database 940 for use to train the feature detection model 930.

Under runtime mode, the model applier 920 may retrieve, identify, or receive the image 960B included in the input 950 from the imaging device 910. The imaging device 910 may acquire or generate at least one image 960B of at least one sample. The sample may include any object or item, the image 960B of which is acquired via the imaging device 910 (e.g., a camera). The sample may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The sample may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject, among others. The imaging device 910 may acquire the input image 960B of the sample in accordance with microscopy techniques, such as using an optical microscope, a confocal microscope, a fluorescence microscope, a phosphorescence microscope, an electron microscope, among others.

With the acquisition of the image 960B, the imaging device 910 may provide, send, or transmit the input 950 including the image 960B to the image classification system 902. The image 960B may be similar to the sample image 960A, and may include one or more features 980 within the image 960B. In some cases, at least two of the features 980 in the image 960B may also have an intersection 985. On the other hand, the image 960B may lack any annotations, the confidence map 965A, the localization map 970A, and the weighted map 975A that are associated with the sample image 960A. In some embodiments, the imaging device 910 may acquire multiple input images 960B as a set to provide to the feature detection system 905 via the input 950. The model applier 920 may in turn receive the input 950 including the image 960B from the imaging device 910.

Figure 10:
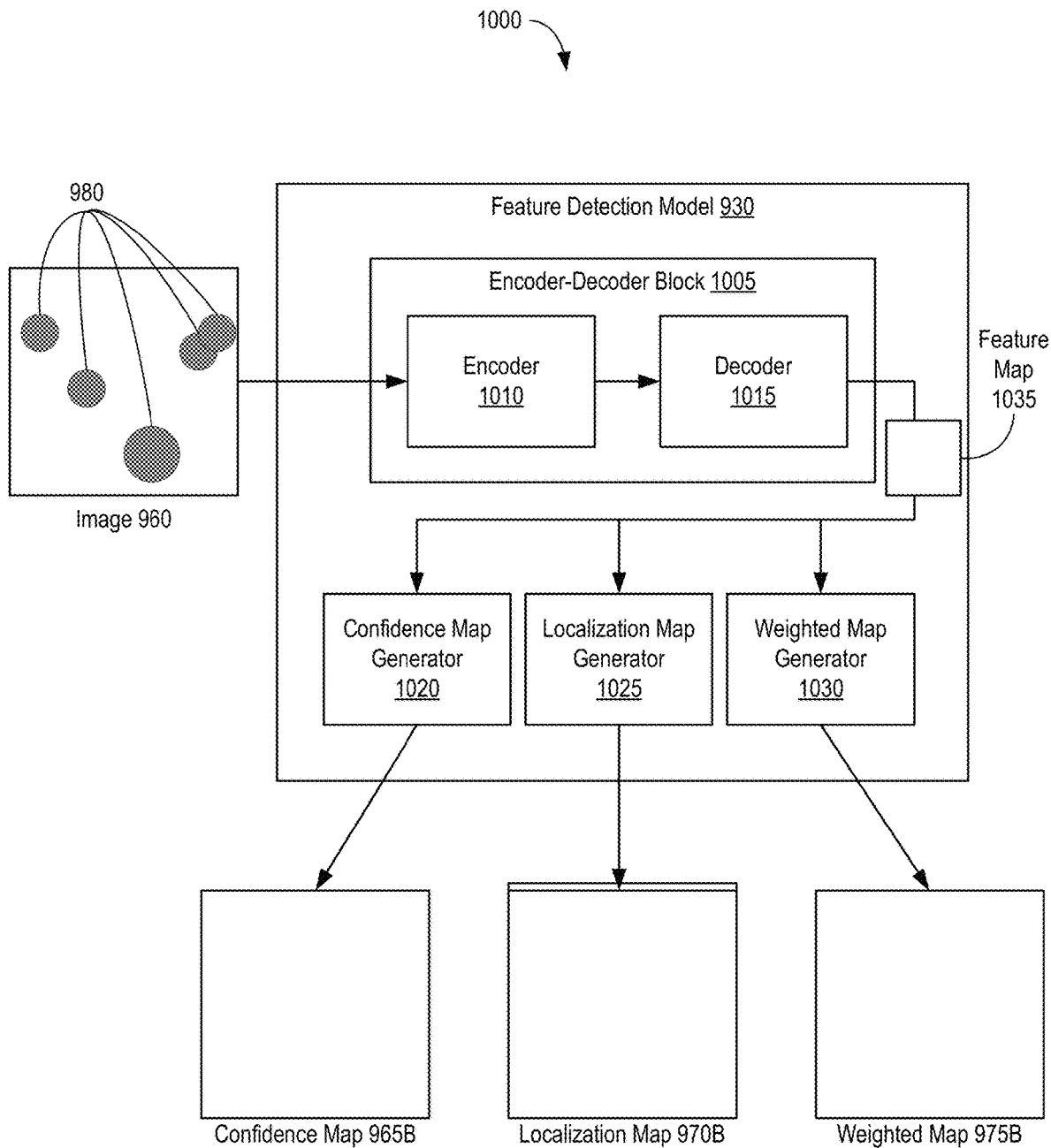
FIG. 10 depicts a block diagram of a feature detection model in the system for feature detection in accordance with an illustrative embodiment.

Referring now to FIG. 10, depicted is a block diagram of the feature detection model 930 in the system 900 for feature detection. As illustrated, the feature detection model 930 may include at least one encoder-decoder block 1005, at least one confidence map generator 1020, at least one localization map generator 1025, and at least one weighted map generator 1030, among others. The encoder-decoder block 1005 may include at least one encoder 1010 and at least one decoder 1015. In some embodiments, the encoder-decoder block 1105 may include a set of encoders 1010 and a set of decoders 1015 (e.g., as depicted in the architecture in FIG. 1 or FIG. 6). Additional details of each of the components in the feature detection model 930 are discussed herein in conjunction with FIGS. 11A-G.

The encoder-decoder block 930 may have at least one input, at least one output, and a set of weights (also referred herein as a parameters) to relate the input and output. The input of the encoder-decoder block 930 may include the image 960 (generally referring to the image 960A from the training dataset 940 or the image 960B of the input 950). The image 960 may include one or more features 980 as discussed above. The output of the encoder-decoder block 930 may include at least one feature map 1035 corresponding to the result of the processing of the image 960 by the encoder 1010 and the decoder 1015.

Within the encoder-decoder block 930, the encoder 1010 and the decoder 1015 may be connected in series, and may each may have at least one input and at least one output. The input of the encoder 1010 may correspond to the input of the encoder-decoder block 1005. The output of the encoder 1010 may include the feature map corresponding to the result of the processing of the image 960 by the encoder 1010. The feature map outputted by the encoder 1010 may have dimensions lesser than the original dimensions of the image 960. The input of the decoder 1015 may correspond to the output from the encoder 1010. The output of the decoder 1015 may correspond to the output of the overall encoder-decoder block 1005, and may include the feature map 1035. The feature map 1035 outputted by the decoder 1015 (and by extension the encoder-decoder block 1005) may have dimensions greater than the dimensions the feature map outputted by the encoder 1010, and may be the same as or less than the dimensions of the image 960 fed as the input of the encoder-decoder block 1005.

Furthermore, the confidence map generator 1020, the localization map generator 1025, and the weighted map generator 1030 each may include at least one input, at least one output, and a set of weights (also referred herein as parameters) to relate the input and output. The confidence map generator 1020, the localization map generator 1025, and the weighted map generator 1030 may be connected in parallel relative to one another to the encoder-decoder block 1005. The input of the confidence map generator 1020, the localization map generator 1025, and the weighted map generator 1030 may correspond to the output of the encoder-decoder block 1005, and may include the feature map 1035. The output of the confidence map generator 1020 may include at least one confidence map 965B. The output of the localization map generator 1025 may include at least one localization map 970B. The output of the weighted map generator 1030 may include at least one weighted map 975B. The dimensions of the confidence map 965B, the localization map 970B, and the weighted map 975B may be the same as one another, and may also be the same as or less than the dimensions of the image 960 fed into the feature detection model 930.

The model applier 920 may apply the feature detection model 930 to the image 960 (generally referring to the image 960A from the training dataset 940 or the image 960B of the input 950). As discussed above, the image 960 may have one or more features 980. The image 960 may be defined by dimensions (e.g., number of pixels along x, y, or z-axis), and the feature 980 may correspond to a subset of pixels within the image 960. In applying, the model applier 920 may feed the image 960 as the input to the feature detection model 930 and (by extension) the input to the encoder-decoder block 1005. The model applier 920 may process the image 960 using the weights of the encoder 1010 and the decoder 1015 in the encoder-decoder block 1005 to produce or generate the corresponding feature map 1035. The feature map 1035 may have the same dimensions (or resolution) as the image 960. The feature map 1035 may be a representation of the image 980 subsequent to the application of the weights of the encoder-decoder block 1005. In some embodiments, the feature map 1035 may have different dimensions (e.g., greater than or less than) as the dimensions of the image 960.

Continuing on, the model applier 920 may apply the feature map 1035 outputted by the encoder-decoder block 1005 to the confidence map generator 1020, the localization map 1025, and the weighted map generator 1030 (e.g., in parallel as depicted). In applying, the model applier 920 may feed the feature map 1035 as the input to the confidence map generator 1020. The model applier 920 may process the feature map 1035 in accordance with the weights of the confidence map generator 1020 to output the corresponding confidence map 965B (sometimes referred herein as a predicted confidence map). The confidence map 965B may be similar to the confidence map 965A as discussed above. The confidence map 965B may specify, define, or otherwise identify a confidence score for each pixel. The confidence score may indicate a level of correlation (e.g., 0 to 1 or −1 to 1) of the pixel as associated with one of the features 980 in the image 960. The confidence map 965B outputted by the confidence map generator 1020 may have the same dimension as the input image 960. In some embodiments, the confidence map 965B outputted by the confidence map generator 1020 may have different dimension (e.g., less than or greater than) as the input image 960.

The model applier 920 may feed the feature map 1035 as the input to the localization map generator 1025. The model applier 920 may process the feature map 1035 in accordance with the weights of the localization map generator 1025 to output the corresponding localization map 965B (sometimes referred herein as a predicted localization map) or a corresponding set of localization maps 970B. The localization map 965B may be similar to the localization map 970A as discussed above. The localization map 970B may specify, define, or otherwise identify a magnitude or a direction to apply to the confidence score of each pixel in the confidence map 965B. In some embodiments, the magnitude and direction may be defined using a vector for each pixel. For a given pixel identified by the localization map 970B, the magnitude may define a factor (e.g., a multiplicative factor or an adjustment value) to apply the confidence score at the corresponding pixel in the confidence map 965A. The direction for the pixel identified in the localization map 970B may define a shift in pixels (e.g., in any direction) to apply to the confidence score at the corresponding pixel in the confidence map 965A. In some embodiments, the image 960 may be associated with a set of localization maps 970B, with each localization map 970B associated with a respective axis. The localization map 970B outputted by the localization map generator 1025 may have the same dimension as the input image 960. In some embodiments, the localization map 970B outputted by the localization map generator 1025 may have different dimension (e.g., less than or greater than) as the input image 960.

The model applier 920 may feed the feature map 1035 as the input to the weighted map generator 1030. The model applier 920 may process the feature map 1035 in accordance with the weights of the weighted map generator 1030 to output the corresponding weighted map 975B (sometimes referred herein as a predicted weighted map). The weighted map 975B may be similar to the weighted map 975A as discussed above. The weighted map 975B may specify, define, or otherwise identify a weight to apply to the confidence score at each pixel in the confidence map 965A. In some embodiments, the weighted map 975B may identify the weight to apply to the confidence score, subsequent to the application of the magnitude or direction defined by the associated localization map 970B. The weight may take into account of overlap or intersections between one or more features 980 in the image 960. The weighted map 975B outputted by the weighted map generator 1030 may have the same dimension as the input image 960. In some embodiments, the weighted map 975B outputted by the weighted map generator 1030 may have different dimension (e.g., less than or greater than) as the input image 960.

Figure 11A:
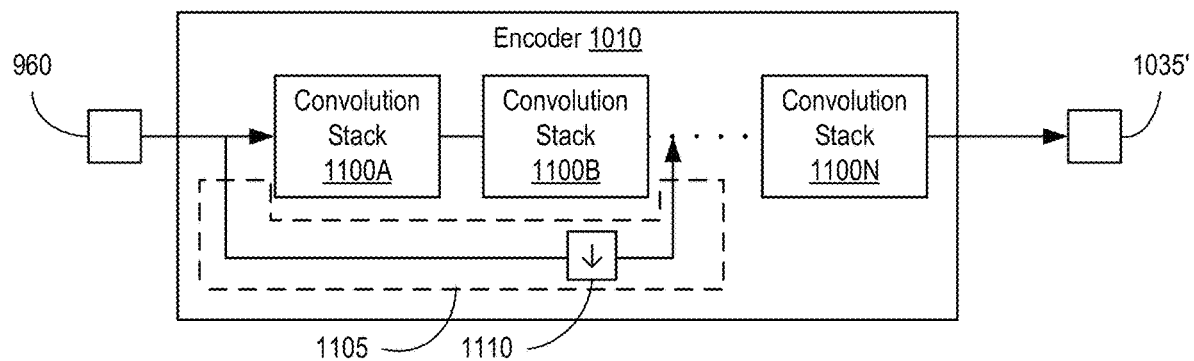
FIG. 11A depicts a block diagram of an encoder in the feature detection model in accordance with an illustrative embodiment.

Referring now to FIG. 11A, depicted is a block diagram of the encoder 1010 in the feature detection model 930. As illustrated, the encoder 1010 may include the image 960 as the input and the feature map 1035 as the output as discussed above. The encoder 1010 may include a set of convolution stacks 1100A-N (hereinafter generally referred as convolution stacks 1100). The input and the output of the encoder 1010 may be related via a set of parameters define within the set of convolution stacks 1100. The set of convolution stacks 1100 can be arranged in series or parallel configuration, or in any combination. In a series configuration, the input of one convolution stacks 1100 may include the output of the previous convolution stacks 1100. In parallel configuration, the input of one convolution stacks 1100 may include the input of the entire encoder 1010.

In some embodiments, the encoder 1010 may include at least one feed forward operator 1105. The feedback forward operator 1105 may combine the output of one or more convolution stacks 1100 (e.g., two as depicted) with input before the application of the one or more convolution stacks 1100. The combination may include addition, concatenation, or a weighted summation, among others. In some embodiments, the feed forward operator 1105 of the encoder 1010 may include at least one down-sampler 1110. The down-sampler 1110 may perform a dimension reduction to the input (e.g., prior to the application of the one or more convolution stacks 1100) conveyed via the feed forward operator 1105. The dimension reduction may include, for example, a pooling operation (e.g., a max-pooling, an average-pooling, or a min-pooling) or down-sampling operation (e.g., low-pass filter and decimation). The combination and the down-sampling may serve to aid in preserving, accentuating, or otherwise maintaining information related to the one or more features 980 in the image 960 through the feature map 1035 outputted from the convolution stacks 1100 of the encoder 1010.

Figure 11B:
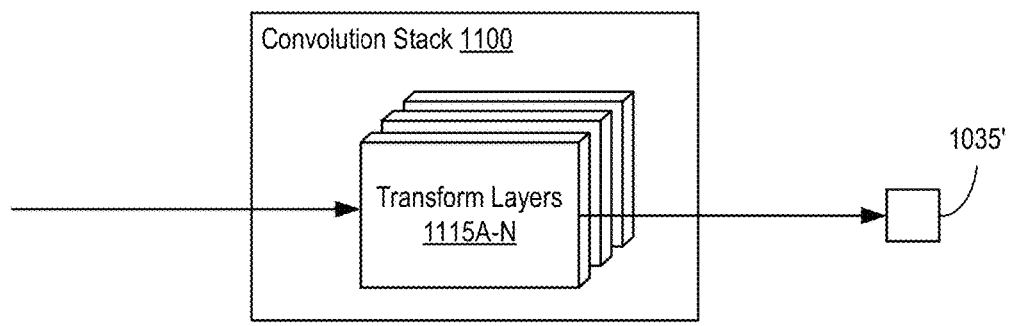
FIG. 11B depicts a block diagram of a convolution stack in the encoder of the feature detection model in accordance with an illustrative embodiment.

Referring now to FIG. 11B, depicted is a block diagram of the convolution stack 1100 in the encoder 1010 of the feature detection mode 930. The convolution stack 1100 may include a set of transform layers 1115A-N (hereinafter generally referred to as transform layers 1115). The set of transform layers 1115 may be arranged in series or parallel configuration, or in any combination. The transform layers 1115 may define or include the weights for the corresponding convolution stack 1100 in the encoder 1010. The set of transform layers 1115 can include one or more weights to modify or otherwise process the input to produce or generate an output feature map 1035'. For example, the set of transform layers 1115 may include at least one convolutional layer, at least one normalization layer, and at least one activation layer, among others. The input may include one of the images 960 when the convolution stack 1100 is the first in the encoder 1010. The input may include a resultant feature map 1035' when the convolution stack 11100 is not the first in the encoder 1010. The set of transform layers 1115 can be arranged in series, with an output of one transform layer 1115 fed as an input to a succeeding transform layer 1115. Each transform layer 1115 may have a non-linear input-to-output characteristic. In some embodiments, the set of transform layers 1115 may be a convolutional neural network (CNN). The convolutional layer, the normalization layer, and the activation layer (e.g., a rectified linear unit (ReLU)) may be arranged in accordance with the CNN architecture.

Figure 11C:
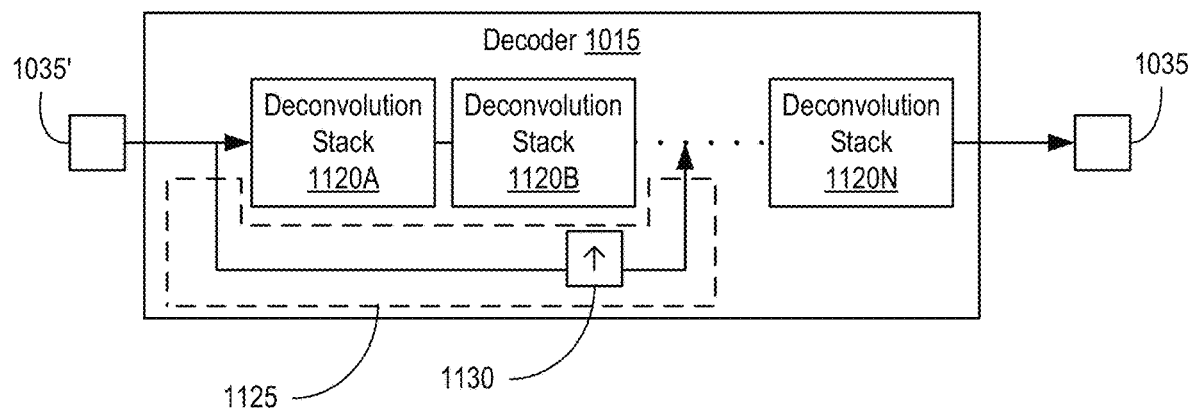
FIG. 11C depicts a block diagram of a decoder in the feature detection model in accordance with an illustrative embodiment.

Referring now to FIG. 11C, depicted is a block diagram of the decoder 1015 in the feature detection model 930. At illustrated, the decoder 1015 may include the image 960 as the input and the feature map 1035' as the output as discussed above. The decoder 1015 may include a set of deconvolution stacks 1120A-N (hereinafter generally referred as deconvolution stacks 1120). The input and the output of the decoder 1015 may be related via a set of parameters define within the set of deconvolution stacks 1120. The set of deconvolution stacks 1120 can be arranged in series or parallel configuration, or in any combination. In a series configuration, the input of one deconvolution stacks 1120 may include the output of the previous deconvolution stacks 1120. In parallel configuration, the input of one deconvolution stacks 1120 may include the input of the entire decoder 1015.

In some embodiments, the decoder 1015 may include at least one feed forward operator 1125. The feedback forward operator 1125 may combine the output of one or more deconvolution stacks 1120 (e.g., two as depicted) with input before the application of the one or more deconvolution stacks 1120. The combination may include addition, concatenation, or a weighted summation, among others. In some embodiments, the feed forward operator 1125 of the decoder 1015 may include at least one up-sampler 1130. The up-sampler 1130 may perform a dimension expansion to the input (e.g., prior to the application of the one or more deconvolution stacks 1120) conveyed via the feed forward operator 1125. The dimension expansion may include, for example, an up-sampling operation. The up-sampling operation may include inclusion of default values (e.g., null values) to separate the existing values in the input, the. The combination and the down-sampling may serve to aid in preserving, accentuating, or otherwise maintaining information related to the one or more features 980 in the image 960 through the feature map 1035 outputted from the deconvolution stacks 1120 of the decoder 1015.

Figure 11D:
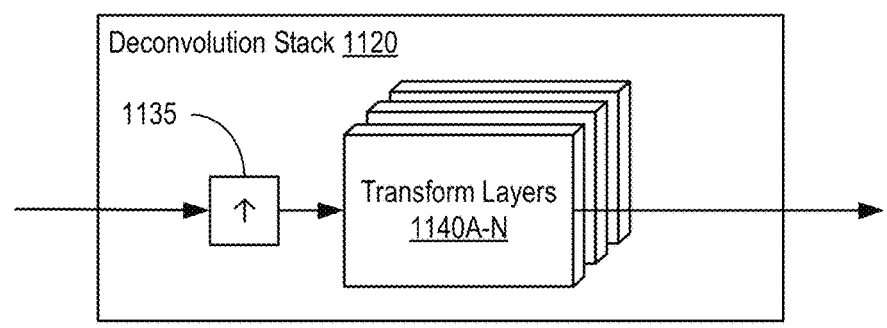
FIG. 11D depicts a block diagram of a deconvolution stack in a decoder of the feature detection model in accordance with an illustrative embodiment.

Referring now to FIG. 11D, depicted is a block diagram of the deconvolution stack 1120 in the decoder 1015 of the feature detection model 930. The deconvolution stack 1120 may include at least one up-sampler 1135 and a set of transform layers 1140A-N (hereinafter generally referred to as transform layers 1140). The up-sampler 1135 and the set of transform layers 1140 can be arranged in series (e.g., as depicted) or parallel configuration, or in any combination. The up-sampler 1135 may function similar or the same as the up-sampler 1130 discussed above. The up-sampler 1135 may perform a dimension expansion to the input (e.g., the up-sampling operation as discussed above). The transform layers 1140 may define or include the weights for the corresponding deconvolution stack 1120 in the decoder 1015. The set of transform layers 1140 can include one or more weights to modify or otherwise process the input feature map 1035' to produce or generate an output feature map 1035. For example, the set of transform layers 1140 may include at least one convolutional layer, at least one normalization layer, and at least one activation layer, among others. The input may include one of the images 960 when the deconvolution stack 1120 is the first in the decoder 1015. The input may include a resultant feature map 1035 when the deconvolution stack 1120 is not the first in the decoder 1015. The set of transform layers 1140 can be arranged in series, with an output of one transform layer 1140 fed as an input to a succeeding transform layer 1140. Each transform layer 1140 may have a non-linear input-to-output characteristic. In some embodiments, the set of transform layers 1140 may be a convolutional neural network (CNN). The convolutional layer, the normalization layer, and the activation layer (e.g., a rectified linear unit (ReLU)) may be arranged in accordance with the CNN architecture.

Figure 11E:
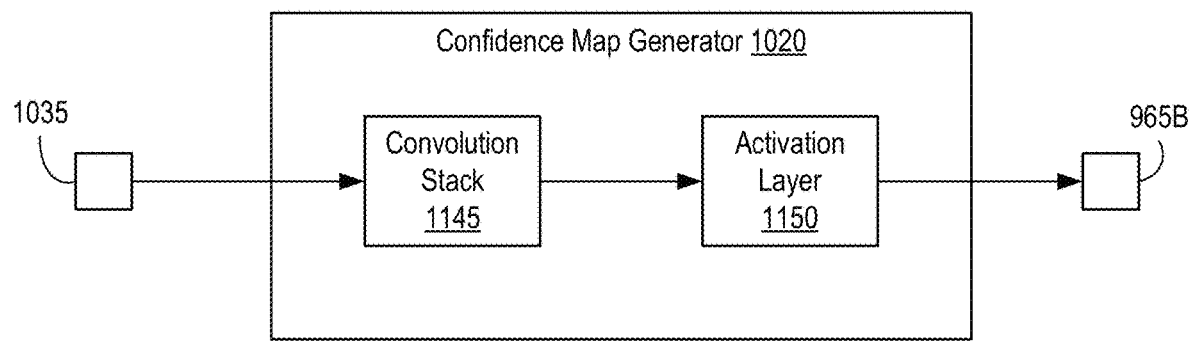
FIG. 11E depicts a block diagram of a confidence map generator of the feature detection model in accordance with an illustrative embodiment.

Referring now to FIG. 11E, depicted is a block diagram of the confidence map generator 1020 of the feature detection model 930. As illustrated, the confidence map generator 1020 may include at least one convolution stack 1145 and at least one activation layer 1150. The convolution stack 1145 and at least one activation layer 1150 may be arranged in series (e.g., as depicted) or parallel configuration, or in any combination. The convolution stack 1145 and at least one activation layer 1150 may define the weights in the confidence map generator 1020. The convolution stack 1145 may be similar to the convolution stacks 1100 discussed above, and may have transform layers similar to the transform layers 1145 described above. The activation layer 1150 may apply an activation function to the input feature map 1035 (e.g., each value in the feature map 1035) to generate a corresponding confidence map 965B. The activation function may include, for example, a sigmoid function (e.g., as discussed above in Sections A and B), an identity function, a unit step function, a hyperbolic function, an arcus function, or a rectifier function, among others.

Figure 11F:
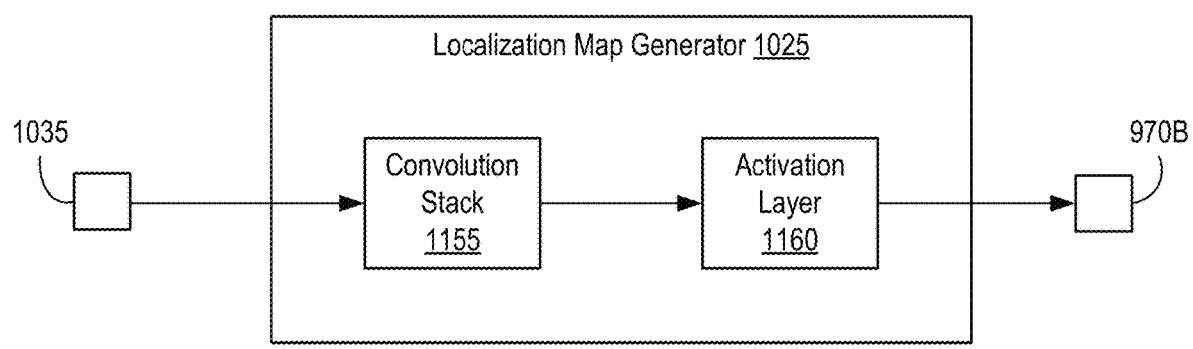
FIG. 11F depicts a block diagram of a localization map generator of the feature detection model in accordance with an illustrative embodiment

Referring now to FIG. 11F, depicted is a block diagram of the localization map generator 1025 of the feature detection model 930. As illustrated, the localization map generator 1025 may include at least one convolution stack 1155 and at least one activation layer 1160. The convolution stack 1155 and at least one activation layer 1160 may be arranged in series (e.g., as depicted) or parallel configuration, or in any combination. The convolution stack 1155 and at least one activation layer 1160 may define the weights in the localization map generator 1025. The convolution stack 1155 may be similar to the convolution stacks 1100 discussed above, and may have transform layers similar to the transform layers 1145 described above. The activation layer 1160 may apply an activation function to the input feature map 1035 (e.g., each value in the feature map 1035) to generate a corresponding localization map 970B. The activation function may include, for example, a sigmoid function, an identity function (e.g., as discussed above in Sections A and B), a unit step function, a hyperbolic function, an arcus function, or a rectifier function, among others.

Figure 11G:
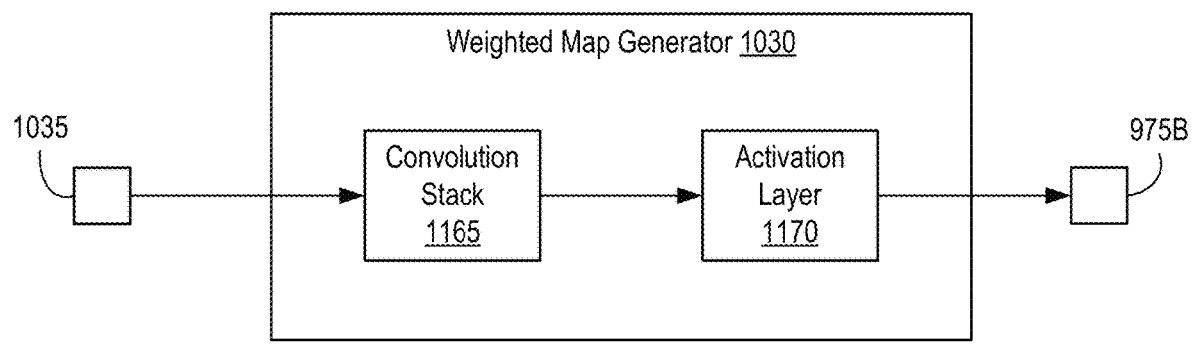
FIG. 11G depicts a block diagram of a weighted map generator of the feature detection model in accordance with an illustrative embodiment.

Referring now to FIG. 11G, depicted is a block diagram of a weighted map generator 1030 of the feature detection model 930. As illustrated, the weighted map generator 1030 may include at least one convolution stack 1165 and at least one activation layer 1170. The convolution stack 1165 and at least one activation layer 1170 may be arranged in series (e.g., as depicted) or parallel configuration, or in any combination. The convolution stack 1165 and at least one activation layer 1170 may define the weights in the weighted map generator 1030. The convolution stack 1165 may be similar to the convolution stacks 1100 discussed above, and may have transform layers similar to the transform layers 1145 described above. The activation layer 1170 may apply an activation function to the input feature map 1035 (e.g., each value in the feature map 1035) to generate a corresponding weighted map 975B. The activation function may include, for example, a sigmoid function, an identity function, a unit step function, a hyperbolic function, an arcus function, or a rectifier function (e.g., a rectified linear unit as discussed above in Sections A and B), among others.

Figure 12:
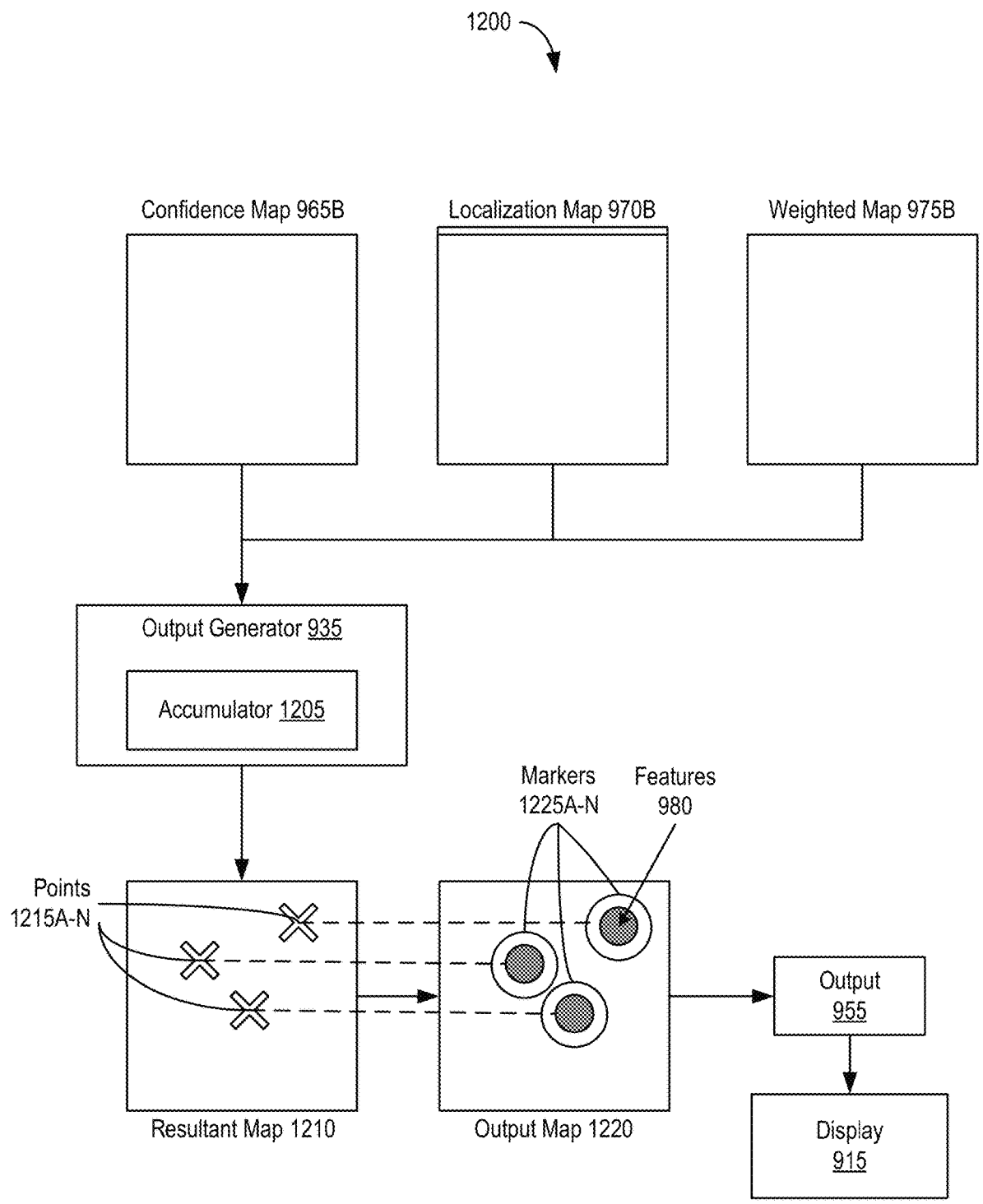
FIG. 12 depicts a sequence diagram of an output generation process in the system for feature detection in accordance with an illustrative embodiment.

Referring now to FIG. 12, depicted is a sequence diagram of an output generation process 1200 in the system for feature detection. Under the output generation process 1200, the output generator 935 may generate at least one resultant map 1210 based on the confidence map 965B, the localization map 970B, and the weighted map 975B. In some embodiments, the output generator 935 may omit the weighted map 975B in generating the resultant map 1210. The resultant map 1210 may include or identify one or more points 1215A-N (hereinafter generally referred to as points 1215). Each point 1215 may be correlated with, correspond to, or may otherwise identify a corresponding feature 980 in the image 960 applied to the feature detection model 930. Each point 1215 may correspond to a centroid of the corresponding feature 980 in the image 960. The generation of the resultant map 1210 may be performed under the training mode and the runtime mode.

To generate the resultant map 1210, the output generator 935 may add, merge, or otherwise combine the confidence map 965B, the localization map 970B, and the weighted map 975B. In combining, the output generator 935 may identify each pixel of the confidence map 965B and the corresponding confidence score indicated by the pixel. For each pixel in the confidence map 965B, the output generator 935 may apply the magnitude and the direction identified by the localization map 970B to generate an intermediary map. In some embodiments, in applying, the output generator 935 may determine, assign, or otherwise set the value for each pixel based on the corresponding magnitude defined by the localization map 970B and the corresponding confidence score at the pixel in the confidence map 965B. The output generator 935 may shift the pixel coordinate of each value in accordance with the direction identified by the localization map 970B for the pixel. The process may be repeated over all the pixels in the confidence map 965B to generate the resultant map 1210.

With the generation of the intermediary map from the confidence map 965B and the localization map 970B, the output generator 935 may identify the weighted map 975B and the weight identified for each pixel. For each pixel in the intermediary map, the output generator 935 may apply the weight specified by the weighted map 975B for the pixel to the value the corresponding pixel on the intermediary map. By applying, the output generator 935 may determine, assign, or otherwise set the value for the pixel based on the corresponding weight and the corresponding confidence value in the intermediary map. In some embodiments, the application of the weights of the weighted map 975B may be omitted from the generation of the resultant map 1210. The combination of the confidence map 965B, the localization map 970B, and the weighted map 975B may produce the resultant map 1210 with the identification of the one or more points 1215.

In some embodiments, the output generator 935 may apply at least one accumulator 1205 to the combination of the confidence map 965B, the localization map 970B, and the weighted map 975B. The combination may correspond to the resultant map 1210. The accumulator 1205 may include, for example, a non-maximum suppression operation (e.g., as discussed above in Sections A and B), a mean-shift operation, and a duplicate-removal operation, among others. By applying the accumulator 1205, the output generator 935 may reduce the number of pixels about the area within the resultant map 1210 corresponding to each of the features 980 to fewer pixels (e.g., a single pixel) representing the point 1215. For example, the accumulator 1205 may be used to reduce a group of pixels of certain colors to a centroid pixel corresponding to the point 1215.

Under training mode, the model trainer 925 may calculate or determine an error metric using any of the confidence map 965B, the localization map 970B, the weighed map 975B, and the resultant map 1210. The error metric may indicate a degree of deviation between the confidence map 965B, the localization map 970B, the weighed map 975B, and the resultant map 1210 generated versus the expected confidence map 965A, the localization map 970B, the weighed map 975B, and the annotations for the image 960A. The error metric may be calculated in accordance with any number of loss functions, such as mean squared error (MSE), a quadratic loss, and a cross-entropy loss (e.g., as discussed above in Sections A and B), among others.

To determine the error metric, the model trainer 925 may calculate or determine one or more error components based on comparisons between the generated maps and the sample maps in the training dataset 945. Each error component may indicate the degree of deviation for a given generated map versus the expected map of the training dataset 945. In some embodiments, each error component may be calculated in accordance with any of the loss functions discussed above. In some embodiments, for the confidence map 965B, the localization map 970B, and the weighted map 975B, the error component may, correspond to a pixel wise difference in the values between the maps. Based on the one or more error components, the model trainer 925 may determine the error metric. In some embodiments, the model trainer 925 may combine the one or more error components (e.g., in accordance with the loss function), and use the combination to determine the error metric.

In some embodiments, the model trainer 925 may determine a confidence map error component based on a comparison between the confidence map 965A and the confidence map 965B. The confidence map error component may indicate the degree of deviation between confidence map 965B generated by the feature detection model 930 and the confidence map 965A of the training dataset 945. In some embodiments, the model trainer 925 may determine a localization map error component based on a comparison between the localization map 970A and the localization map 970B. The localization map error component may indicate the degree of deviation between localization map 970B generated by the feature detection model 930 and the localization map 970A of the training dataset 945. In some embodiments, the model trainer 925 may determine a weighted map error component based on a comparison between the weighted map 975A and the weighted map 975B. The weighted map error component may indicate the degree of deviation between weighted map 975B generated by the feature detection model 930 and the weighted map 975A of the training dataset 945. In some embodiments, when the generation of the weighted map 975B is omitted or the training dataset 945 lacks the weighted map 975A, the determination of the weighted map error component may be omitted.

In some embodiments, the model trainer 925 may determine a resultant map error component based on a comparison of the points 1215 of the resultant map 1210 and the annotation label for the image 960A used to apply to the feature detection model 930. As discussed above, the annotation label for the image 960A may identify pixel coordinates of the centroid of each feature 980 in the image 960A. For each feature 980, the model trainer 925 may determine a distance metric based on a pixel coordinate of the corresponding point 1215 and the pixel coordinate of the feature 980 indicated in the annotation label. The model trainer 925 may combine the distance metric over all the features 980 identified by the annotation label to determine the resultant map error component. Using the confidence map error component, the localization map error component, the weighted map error component, and the resultant map error component, the model trainer 925 may determine the error metric.

In accordance with the determined error metric, the model trainer 925 may update at least one of the weights in the encoder 1010, the decoder 1015, the confidence map generator 1020, the localization map generator 1025, or the weighted map generator 1030 for the feature detection model 930. The updating of weights may be in accordance with an optimization function (or an objective function) for the feature detection model 930. The optimization function may define one or more rates or parameters at which the weights of the feature detection model 930 are to be updated.

For example, the model trainer 925 may use the optimization function with a set learning rate, a momentum, and a weight decay for a number of iterations in training. The updating of the weights in the feature detection model 930 may be repeated until a convergence condition.

Under runtime mode, the output generator 935 may send, transmit, or provide the one or more points 1215 identified by the resultant map 1210. In some embodiments, the output generator 935 may package the points 1215 identified by the resultant map 1210 to at least one output 955. In some embodiments, the output 955 may include pixel coordinates for each point 1215. The display 915 may be part of the feature detection system 905 or on another computing device that may be communicatively coupled to the feature detection system 905. The display 915 may present or render the output 955 upon receipt. For example, the display 915 may render a graphical user interface that shows the one or points 1215 in relation to the image 960B.

In some embodiments, the output generator 935 may generate at least one output map 1220 to provide via the output 955 based on the image 960B and the one or more points 1215 identified in the resultant map 1210. In generating the output map 1220, the output generator 935 may generate one or more markers 1225A-N (hereinafter generally referred to markers 1225) corresponding to the points 1215 identified in the resultant map 1210. Each marker 1225 may include a visual indicator (e.g., a circle as depicted) for the corresponding point 1215 for the respective feature 980. With the generation, the output generator 935 may include, insert, or add the markers 1225 (e.g., as an overlay) over the image 960B used to apply to the feature detection model 930. The output generator 935 may provide the output map 1220 or the markers 1225 via the output 955. The display 915 may present or render the output map 1220 with the markers 1225 and the features from the image 960B.

Figure 13A:
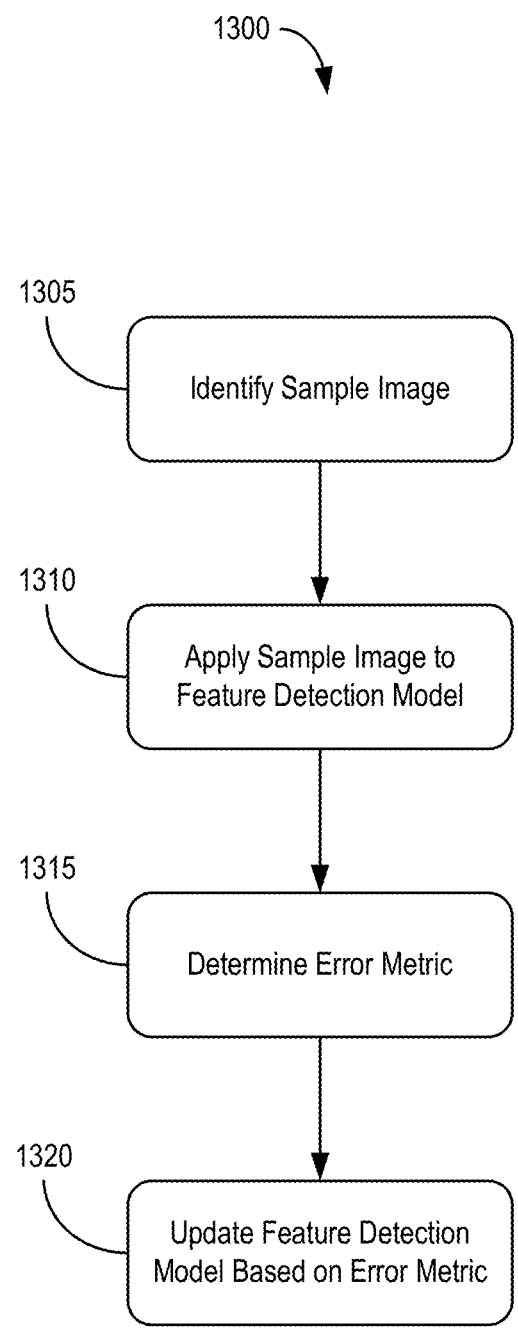
FIG. 13A depicts flow diagram of a method of training models for feature detection in accordance with an illustrative embodiment.

FIG. 13A depicts flow diagram of a method 1300 of training models for feature detection. The method 1300 may be implemented or performed by any of the components described herein in conjunction with FIGS. 1, 6, and 9-12. Under method 1300, a computing system (e.g., the feature detection system 905) may identify a sample image (e.g., the image 760A) (1305). The sample image may be from a training dataset (e.g., the training dataset 945). The computing system may apply the sample image to a feature detection model (e.g., the feature detection model 930) (1310). The feature detection model may include an encoder-decoder (e.g., the encoder-decoder block 1005) and one or more map generators (e.g., the confidence map generator 1020, the localization map generator 1025, the weighted map generator 1030). The computing system may determine an error metric (1315). The error metric may be based on a comparison between the maps generated by the feature detection model and the maps of the training dataset. The computing system may update the feature detection model based on the error metric (1320). At least one of the weights in the encoder-decoder or the map generators may be modified in accordance with the error metric.

Figure 13B:
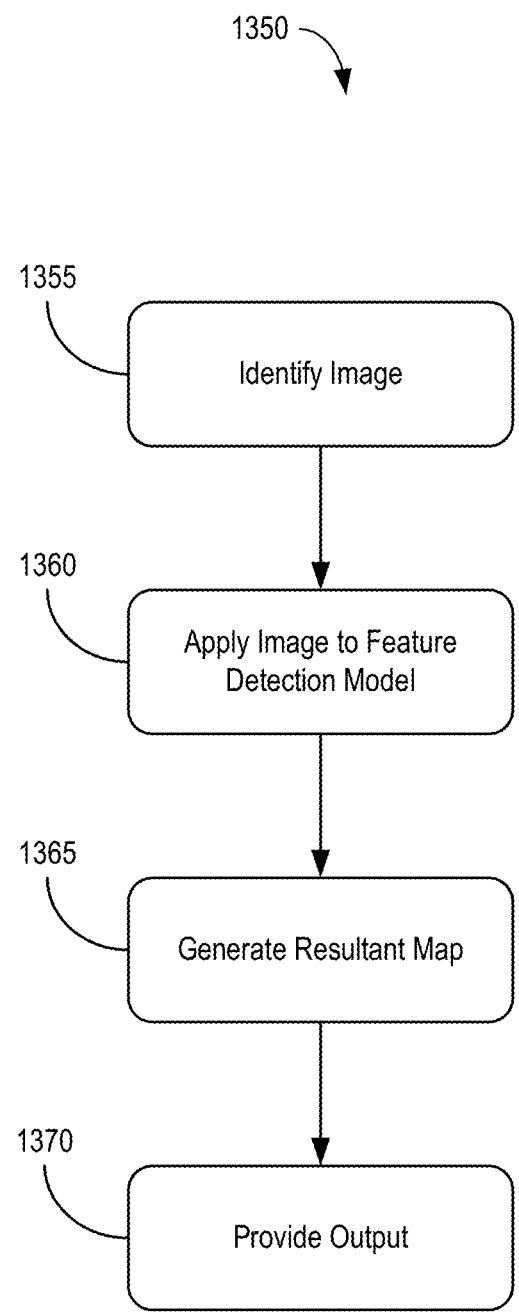
FIG. 13B depicts flow diagram of a method for feature detection in accordance with an illustrative embodiment.

FIG. 13B depicts flow diagram of a method 1350 for feature detection in images. The method 1350 may be implemented or performed by any of the components described herein in conjunction with FIGS. 1, 6, and 9-12. Under method 1350, a computing system (e.g., the feature detection system 905) may identify an image (e.g., the image 760B) (1355). The image may be a biomedical image acquired via an imaging device from a tissue sample. The computing system may apply the image to a feature detection model (e.g., the feature detection model 930) (1360). The feature detection model may include an encoder-decoder (e.g., the encoder-decoder block 1005) and one or more map generators (e.g., the confidence map generator 1020, the localization map generator 1025, the weighted map generator 1030). The computing system may generate a resultant map (e.g., the resultant map 1210) (1365). The generation of the resultant map may be based on a combination of one or more maps (e.g., the confidence map 965B, the localization map 970B, and the weighted map 975B). The computing system may provide an output (e.g., the output 955) (1370).

D. Computing and Network Environment

Figure 14:
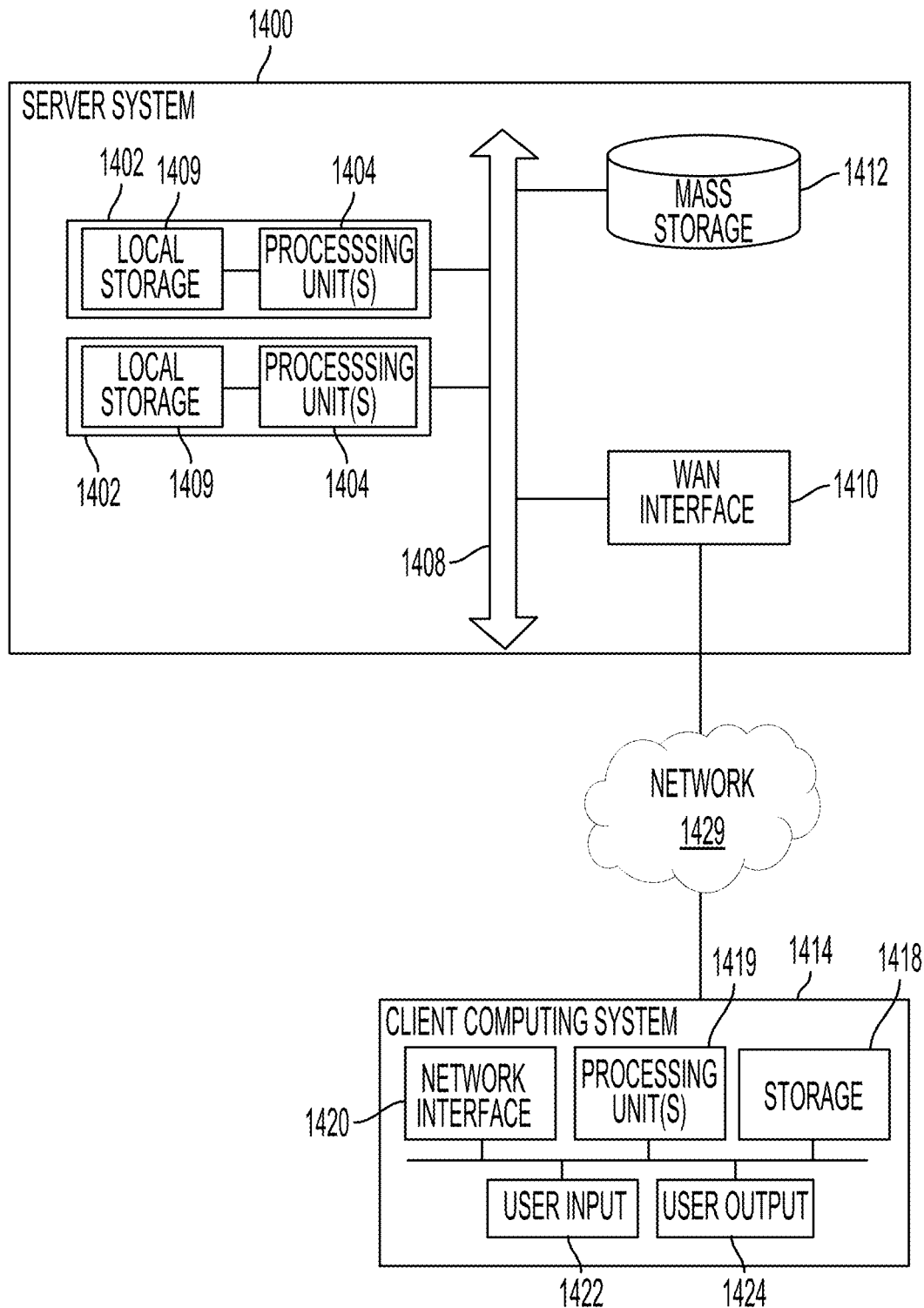
FIG. 14 a block diagram of a server system and a client computer system in accordance with an illustrative embodiment

Various operations described herein can be implemented on computer systems. FIG. 14 shows a simplified block diagram of a representative server system 1400, client computer system 1414, and network 1426 usable to implement certain embodiments of the present disclosure. In various embodiments, server system 1400 or similar systems can implement services or servers described herein or portions thereof. Client computer system 1414 or similar systems can implement clients described herein. The system 100 described herein can be similar to the server system 1400. Server system 1400 can have a modular design that incorporates a number of modules 1402 (e.g., blades in a blade server embodiment); while two modules 1402 are shown, any number can be provided. Each module 14s02 can include processing unit(s) 1404 and local storage 1406.

Processing unit(s) 1404 can include a single processor, which can have one or more cores, or multiple processors. In some embodiments, processing unit(s) 1404 can include a general-purpose primary processor as well as one or more special-purpose co-processors such as graphics processors, digital signal processors, or the like. In some embodiments, some or all processing units 1404 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1404 can execute instructions stored in local storage 1406. Any type of processors in any combination can be included in processing unit(s) 1404.

Local storage 1406 can include volatile storage media (e.g., DRAM, SRAM, SDRAM, or the like) and/or non-volatile storage media (e.g., magnetic or optical disk, flash memory, or the like). Storage media incorporated in local storage 1406 can be fixed, removable or upgradeable as desired. Local storage 1406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1404 need at runtime. The ROM can store static data and instructions that are needed by processing unit(s) 1404. The permanent storage device can be a non-volatile read-and-write memory device that can store instructions and data even when module 1402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

Figure 1B:
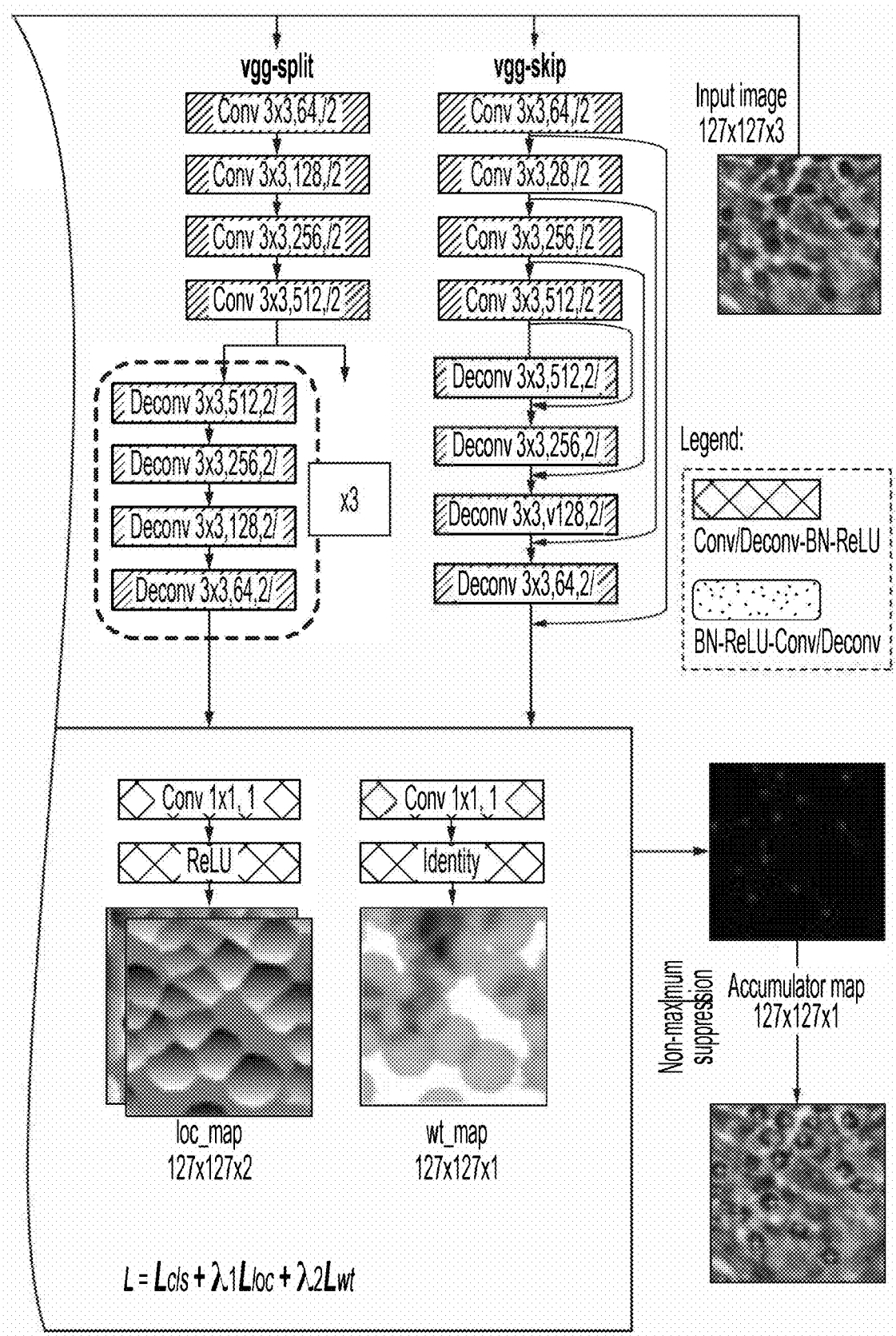

In some embodiments, local storage 1406 can store one or more software programs to be executed by processing unit(s) 1404, such as an operating system and/or programs implementing various server functions such as functions of the system 100 of FIG. 1 or any other system described herein, or any other server(s) associated with system 100 or any other system described herein.

"Software" refers generally to sequences of instructions that, when executed by processing unit(s) 1404 cause server system 1400 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1404. Software can be implemented as a single program or a collection of separate programs or program modules that interact as desired. From local storage 1406 (or non-local storage described below), processing unit(s) 1404 can retrieve program instructions to execute and data to process in order to execute various operations described above.

In some server systems 1400, multiple modules 1402 can be interconnected via a bus or other interconnect 1408, forming a local area network that supports communication between modules 1402 and other components of server system 1400. Interconnect 1408 can be implemented using various technologies including server racks, hubs, routers, etc.

A wide area network (WAN) interface 1410 can provide data communication capability between the local area network (interconnect 1408) and the network 1426, such as the Internet. Technologies can be used, including wired (e.g., Ethernet, IEEE 802.3 standards) and/or wireless technologies (e.g., Wi-Fi, IEEE 802.11 standards).

In some embodiments, local storage 1406 is intended to provide working memory for processing unit(s) 1404, providing fast access to programs and/or data to be processed while reducing traffic on interconnect 1408. Storage for larger quantities of data can be provided on the local area network by one or more mass storage subsystems 1412 that can be connected to interconnect 1408. Mass storage subsystem 1412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1412. In some embodiments, additional data storage resources may be accessible via WAN interface 1410 (potentially with increased latency).

Server system 1400 can operate in response to requests received via WAN interface 1410. For example, one of modules 1402 can implement a supervisory function and assign discrete tasks to other modules 1402 in response to received requests. Work allocation techniques can be used. As requests are processed, results can be returned to the requester via WAN interface 1410. Such operation can generally be automated. Further, in some embodiments, WAN interface 1410 can connect multiple server systems 1400 to each other, providing scalable systems capable of managing high volumes of activity. Other techniques for managing server systems and server farms (collections of server systems that cooperate) can be used, including dynamic resource allocation and reallocation.

Server system 1400 can interact with various user-owned or user-operated devices via a wide-area network such as the Internet. An example of a user-operated device is shown in FIG. 14 as client computing system 1414. Client computing system 1414 can be implemented, for example, as a consumer device such as a smartphone, other mobile phone, tablet computer, wearable computing device (e.g., smart watch, eyeglasses), desktop computer, laptop computer, and so on.

For example, client computing system 1414 can communicate via WAN interface 1410. Client computing system 1414 can include computer components such as processing unit(s) 1416, storage device 1418, network interface 1420, user input device 1422, and user output device 1424. Client computing system 1414 can be a computing device implemented in a variety of form factors, such as a desktop computer, laptop computer, tablet computer, smartphone, other mobile computing device, wearable computing device, or the like.

Processor 1416 and storage device 1418 can be similar to processing unit(s) 1404 and local storage 1406 described above. Suitable devices can be selected based on the demands to be placed on client computing system 1414; for example, client computing system 1414 can be implemented as a "thin" client with limited processing capability or as a high-powered computing device. Client computing system 1414 can be provisioned with program code executable by processing unit(s) 1416 to enable various interactions with server system 1400.

Network interface 1420 can provide a connection to the network 1426, such as a wide area network (e.g., the Internet) to which WAN interface 1410 of server system 1400 is also connected. In various embodiments, network interface 1420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1422 can include any device (or devices) via which a user can provide signals to client computing system 1414; client computing system 1414 can interpret the signals as indicative of particular user requests or information. In various embodiments, user input device 1422 can include any or all of a keyboard, touch pad, touch screen, mouse or other pointing device, scroll wheel, click wheel, dial, button, switch, keypad, microphone, and so on.

User output device 1424 can include any device via which client computing system 1414 can provide information to a user. For example, user output device 1424 can include a display to display images generated by or delivered to client computing system 1414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that functions as both input and output device. In some embodiments, other user output devices 1424 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1404 and 1416 can provide various functionality for server system 1400 and client computing system 1414, including any of the functionality described herein as being performed by a server or client, or other functionality.

It will be appreciated that server system 1400 and client computing system 1414 are illustrative and that variations and modifications are possible. Computer systems used in connection with embodiments of the present disclosure can have other capabilities not specifically described here. Further, while server system 1400 and client computing system 1414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method, comprising:
   identifying, by a computing system, a training dataset having:
      a sample biomedical image having one or more features;
      a first confidence map derived from the sample biomedical image, the first confidence map identifying a confidence score for each pixel as correlated with the one or more features; and
      a first localization map derived from the sample biomedical image, the first localization map identifying at least one of a magnitude and a direction to apply to the first confidence map;
   applying, by the computing system, the sample biomedical image of the training dataset to a feature detection model, the feature detection model comprising:
      an encoder-decoder block having a first set of parameters to generate a feature map corresponding to the sample biomedical image;
      a confidence map generator having a second set of parameters to generate a second confidence map using the feature map; and
      a localization map generator having a third set of parameters to generate a second localization map using the feature map;
   determining, by the computing system, an error metric based on the first confidence map, the second confidence map, the first localization map, and the second localization map; and
   updating, by the computing system, in accordance with the error metric, at least one of the first set of parameters of the encoder-decoder block, the second set of parameters of the confidence map generator, and the third set of parameters of the localization map generator of the feature detection model.

2. The method of claim 1, wherein the training dataset further comprises a first weighted map derived from the first biomedical image, the first weighted map identifying a weight for the confidence score for each pixel as correlated with the one or more features;
   wherein the feature detection model further comprises a weighted map generator having a fourth set of parameters to generate a second weighted map using the feature map; and
   wherein determining the error metric further comprises determining the error metric based on comparing between the first weighted map and the second weighted map.

3. The method of claim 1, wherein the training dataset further comprises a label identifying one or more first points corresponding to the one or more features in the sample biomedical image; and further comprising:
   applying, by the computing system, an accumulator to the second confidence map and a second weighted map to generate a resultant map, the resultant map identifying one or more second points correlated with the one or more features; and
   wherein determining the error metric further comprises determining the error metric based on comparing between the one or more first points and the corresponding one or more second points.

4. The method of claim 1, further comprising:
   determining, by the computing system, a first error component based on comparing between the first confidence map and the second confidence map; and determining, by the computing system, a second error component based on comparing between the first localization map and the second localization map, and wherein determining the error metric further comprises determining the error metric based on a weighted combination of the first error component and the second error component.

5. The method of claim 1, wherein the encoder-decoder block of the feature detection model further comprises at least one of an up-sampler connected with a de-convolution block and a down-sampler connected with a convolution block to maintain information related to the one or more features in the sample biomedical image.

6. The method of claim 1, wherein the training dataset further comprises the sample biomedical image modified in accordance to a data augmentation scheme including at least one of a vertical mirroring, a horizontal mirroring, and a rotation.

7. The method of claim 1, wherein the training dataset further comprises a plurality of sample biomedical images, each of the plurality of sample biomedical images derived from a tissue sample via a histopathological image preparer, the one or more features in each of the plurality of sample biomedical images corresponding to one or more cell nuclei in the tissue sample.

8. A method, comprising:
identifying, by a computing system, a biomedical image having one or more features;
applying, by the computing system, the biomedical image to a feature detection model, the feature detection model comprising:
an encoder-decoder block having a first set of parameters to generate a feature map corresponding to the biomedical image;
a confidence map generator having a second set of parameters to generate a confidence map using the feature map, the confidence map identifying a confidence score for each pixel as correlated with the one or more features; and
a localization map generator having a third set of parameters to generate a localization map using the feature map, the localization map identifying at least one of a magnitude and a direction to apply to each pixel of the confidence map;
generating, by the computing system, a resultant map based on the confidence map and the localization map, the resultant map identifying one or more points corresponding to the one or more features; and
providing, by the computing system, the one or more points identified in the resultant map for the biomedical image.

9. The method of claim 8, wherein the feature detection model further comprises a weighted map generator having a fourth set of parameters to generate a weighted map using the feature map; and
wherein generating the resultant map further comprises generating the resultant map based on a combination of the confidence map, the localization map, and the weighted map.

10. The method of claim 8, wherein providing the one or more points further comprises adding one or more visual markers corresponding to the one or more points to the biomedical image to indicate the one or more features.

11. The method of claim 8, wherein generating the resultant map further comprises applying at least one of the magnitude and the direction identified by the localization map to a corresponding pixel of a plurality of pixels of the confidence map.

12. The method of claim 8, wherein generating the resultant map further comprises applying an accumulator to a combination of the confidence map and the localization map, the accumulator including at least one of a non-maximum suppression operation, a mean-shift operation, and a duplicate-removal operation.

13. The method of claim 8, wherein the encoder-decoder block of the feature detection model further comprises at least one of an up-sampler connected with a de-convolution block and a down-sampler connected with a convolution block to maintain information related to the one or more features in the biomedical image.

14. The method of claim 8, further comprises establishing, by the computing system, the feature detection model using a training dataset having: a sample biomedical image, a sample confidence map derived from the sample biomedical image, and a sample localization map derived from the sample biomedical image.

15. A system, comprising:
a computing system having one or more processors coupled with memory, configured to:
identify a biomedical image having one or more features;
apply the biomedical image to a feature detection model executed on the one or more processors of the computing system, the feature detection model comprising:
an encoder-decoder block having a first set of parameters to generate a feature map corresponding to the biomedical image;
a confidence map generator having a second set of parameters to generate a confidence map using the feature map, the confidence map identifying a confidence score for each pixel as correlated with the one or more features; and
a localization map generator having a third set of parameters to generate a localization map using the feature map, the localization map identifying at least one of a magnitude and a direction to apply to the confidence map;
generate a resultant map based on the confidence map and the localization map, the resultant map identifying one or more points corresponding to the one or more features; and
provide the one or more points identified in the resultant map for the biomedical image.

16. The system of claim 15, wherein the feature detection model further comprises a weighted map generator having a fourth set of parameters to generate a weighted map using the feature map; and
wherein the computing system is further configured to generate the resultant map based on a combination of the confidence map, the localization map, and the weighted map.

17. The system of claim 15, wherein the computing system is further configured to add one or more visual markers corresponding to the one or more points to the biomedical image to indicate the one or more features.

18. The system of claim 15, wherein the computing system is further configured to apply at least one of the magnitude and the direction identified by the localization map to a corresponding pixel of a plurality of pixels of the confidence map.

19. The system of claim 15, wherein the computing system is further configured to apply an accumulator to a combination of the confidence map and the localization map, the accumulator including at least one of a non-maximum suppression operation, a mean-shift operation, and a duplicate-removal operation.

20. The system of claim 15, wherein the computing system is further configured to establish the feature detection model using a training dataset having: a sample biomedical image, a sample confidence map derived from the sample biomedical image, and a sample localization map derived from the sample biomedical image.

\* \* \* \* \*